(12) United States Patent
Bukesov

(10) Patent No.: US 9,699,422 B2
(45) Date of Patent: Jul. 4, 2017

(54) COMPOSITE AND OTHER PHOSPHOR MATERIALS FOR EMITTING VISIBLE LIGHT AND APPLICATIONS IN GENERATION OF VISIBLE LIGHT INCLUDING LIGHT-EMITTING SCREENS

(75) Inventor: Sergey A. Bukesov, Acton, MA (US)

(73) Assignee: PRYSM, INC., San Jose, CA (US)

( * ) Notice: Subject to any disclaimer, the term of this patent is extended or adjusted under 35 U.S.C. 154(b) by 905 days.

(21) Appl. No.: 13/252,984

(22) Filed: Oct. 4, 2011

(65) Prior Publication Data

US 2013/0083082 A1    Apr. 4, 2013

(51) Int. Cl.
| | |
|---|---|
| G09G 3/20 | (2006.01) |
| H04N 9/31 | (2006.01) |
| C09K 11/77 | (2006.01) |
| G09G 3/34 | (2006.01) |
| G02B 26/10 | (2006.01) |

(52) U.S. Cl.
CPC ....... *H04N 9/3129* (2013.01); *C09K 11/7734* (2013.01); *H04N 9/3194* (2013.01); *G02B 26/101* (2013.01); *G09G 3/20* (2013.01); *G09G 3/34* (2013.01)

(58) Field of Classification Search
USPC .......................................................... 345/84
See application file for complete search history.

(56) References Cited

U.S. PATENT DOCUMENTS

| | | | |
|---|---|---|---|
| 3,691,482 A | 9/1972 | Pinnow et al. | |
| 7,791,561 B2 | 9/2010 | Hajjar et al. | |
| 7,878,657 B2 | 2/2011 | Hajjar | |
| 2006/0221021 A1* | 10/2006 | Hajjar et al. | 345/84 |
| 2006/0227087 A1 | 10/2006 | Hajjar | |
| 2007/0276606 A1* | 11/2007 | Radkov et al. | 702/19 |
| 2008/0088226 A1 | 4/2008 | Sohn et al. | |

FOREIGN PATENT DOCUMENTS

| | | |
|---|---|---|
| CN | 1885581 A | 12/2006 |
| CN | 101018345 A | 8/2007 |
| CN | 101218621 A | 7/2008 |
| CN | 101460880 A | 6/2009 |
| EP | 2221356 A2 | 8/2010 |
| EP | 2604669 A1 | 6/2013 |
| WO | WO 2005091862 A2 * | 10/2005 |
| WO | 2007131195 A2 | 11/2007 |

(Continued)

OTHER PUBLICATIONS

Bachmann et al., Color Point Tuning for (Sr,Ca,Ba)Si2O2N2:Eu2+ for White Light LEDs, Dec. 29, 2008, Chem. Mater., vol. 21, pp. 316-325.*

(Continued)

*Primary Examiner* — Christine Sung
(74) *Attorney, Agent, or Firm* — Perkins Coie LLP

(57) ABSTRACT

Techniques and optically excited light-emitting devices based on phosphors are provided to use phosphor materials which absorb excitation light to emit visible light and include a composite phosphor material including two or more different transition metal compounds that, under optical excitation of the excitation light, emit visible light at spectrally close but different spectral wavelengths or bands that spectrally overlap to produce a desired color.

30 Claims, 14 Drawing Sheets

(56) References Cited

FOREIGN PATENT DOCUMENTS

WO         2009107535 A1     9/2009
WO   WO 2010074963 A1 *   7/2010

OTHER PUBLICATIONS

Office Action for Chinese Patent Application No. 201210377730.4, Jan. 30, 2014, 8 pages.
Office Action for German Patent Application No. 102012019392.0, Feb. 25, 2014, 5 pages.
Office Action for United Kingdom Patent Application No. GB1217162.5, Jun. 30, 2014, 4 pages.
Office Action for Japanese Patent Application No. 2012-219548, Jan. 28, 2014, 2 pages.
Office Action for German Patent Application No. 102012019392.0, Sep. 12, 2016, 9 pages.

* cited by examiner

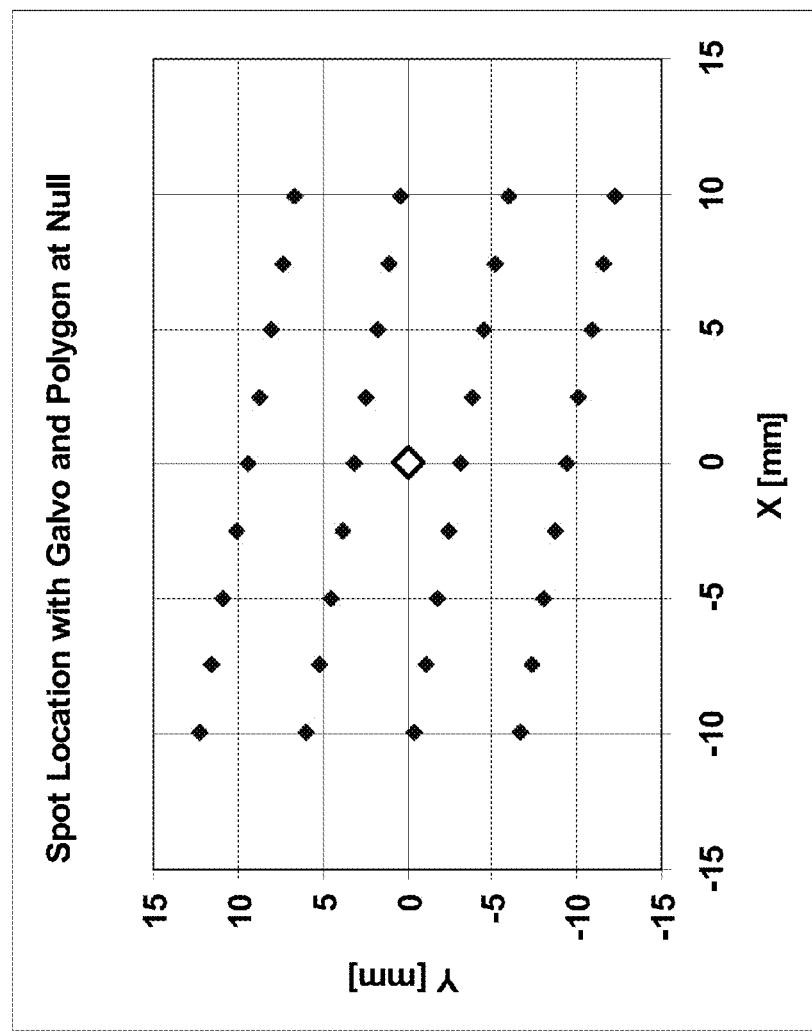

COMPOSITE AND OTHER PHOSPHOR MATERIALS FOR EMITTING VISIBLE LIGHT AND APPLICATIONS IN GENERATION OF VISIBLE LIGHT INCLUDING LIGHT-EMITTING SCREENS

BACKGROUND

This patent document relates to phosphor materials that emit visible light under optical excitation.

Various phosphor materials have been developed for emitting visible light by absorbing excitation light such as light at wavelengths in the violet spectral range (400-450 nm) and the ultra violet (UV) spectral ranges that are shorter than 400 nm. Phosphor materials can be used in display screens, light sources including LED devices and other applications that require generation of visible light.

SUMMARY

This patent document describes, among others, an optically excited light-emitting device based on phosphors that includes phosphor materials which absorb excitation light to emit visible light and include a composite phosphor material including two or more different transition metal compounds that, under optical excitation of the excitation light, emit visible light at spectrally close but different spectral wavelengths or bands that spectrally overlap to produce a desired color.

In one aspect, a method for making a phosphor material for emitting visible light by absorbing excitation light is provided. This method includes selecting (1) one or more red(-deep red) emitting nitride) phosphors (e.g., nitride phosphors) and (2) one or more orange-red emitting phosphors (e.g., silicate phosphors). Each selected red phosphor and each selected orange-red phosphor emit visible light at spectrally close but different spectral wavelengths or bands that spectrally overlap to produce a desired color. This method includes mixing (1) the selected one or more red emitting phosphors and (2) the selected one or more orange-red emitting phosphors with a ratio with respect to one another to form a composite phosphor for producing light at the desired color.

In another aspect, a scanning beam display system based on phosphor material can include an excitation light source to produce one or more excitation beams of the same wavelength having optical pulses that carry image information; a beam scanning module to receive the one or more excitation beams and to scan the one or more excitation beams; and a light-emitting screen positioned to receive the one or more scanning excitation beams and including light-emitting phosphor materials which absorb light of the one or more excitation beams to emit visible light to produce images carried by the one or more scanning excitation beam, wherein the light-emitting phosphor materials include a composite phosphor material that is a mixture of one or more red emitting phosphors and one or more orange-red emitting phosphors and emits light of a desired color.

In yet another aspect, a scanning beam display system based on phosphor materials, can include an excitation light source to produce one or more excitation beams of the same wavelength having optical pulses that carry image information; a beam scanning module to receive the one or more excitation beams and to scan the one or more excitation beams; and a light-emitting screen positioned to receive the one or more scanning excitation beams and including light-emitting phosphor materials which absorb light of the one or more excitation beams to emit visible light to produce images carried by the one or more scanning excitation beam, wherein the light-emitting phosphor materials include (1) (Ba,Sr,Ca)AlSiN$_3$:Eu, or (Ca,Sr,Ba) Si$_2$O$_2$N$_2$:Eu, or (Ca,Sr,Ba)$_2$Si$_5$N$_8$:Eu (Ba,Ca,Sr,Eu)$_2$Si$_5$N$_{8-2x}$O$_x$C$_x$, where $0 \leq Sr_3N_2 < 0.46$, $0 \leq Ba_3N_2 < 0.56$, $0 \leq Ca_3N_2 < 0.30$, $0 < Si_3N_4 < 0.7$, $0 < EuO < 0.38$, $0 \leq SiC \leq 0.12$ that emits red light between 625 nm and 635 nm, (2) (Sr,Ba,Ca)$_2$SiO$_4$:Eu that emits green light green between 525 nm to 530 nm, and (3) Sr$_3$MgSi$_2$O$_8$:Eu that emits blue between 455 nm and 465 nm.

These and other aspects, examples and implementations are described in detail in the drawings, the detailed description and the claims.

BRIEF DESCRIPTION OF THE DRAWINGS

FIG. 5B shows a map of beam positions on the screen produced by a laser array of thirty-six excitation lasers and one IR servo laser when a vertical galvo scanner and a horizontal polygon scanner are at their respective null positions.

DETAILED DESCRIPTION

Figure 1A:
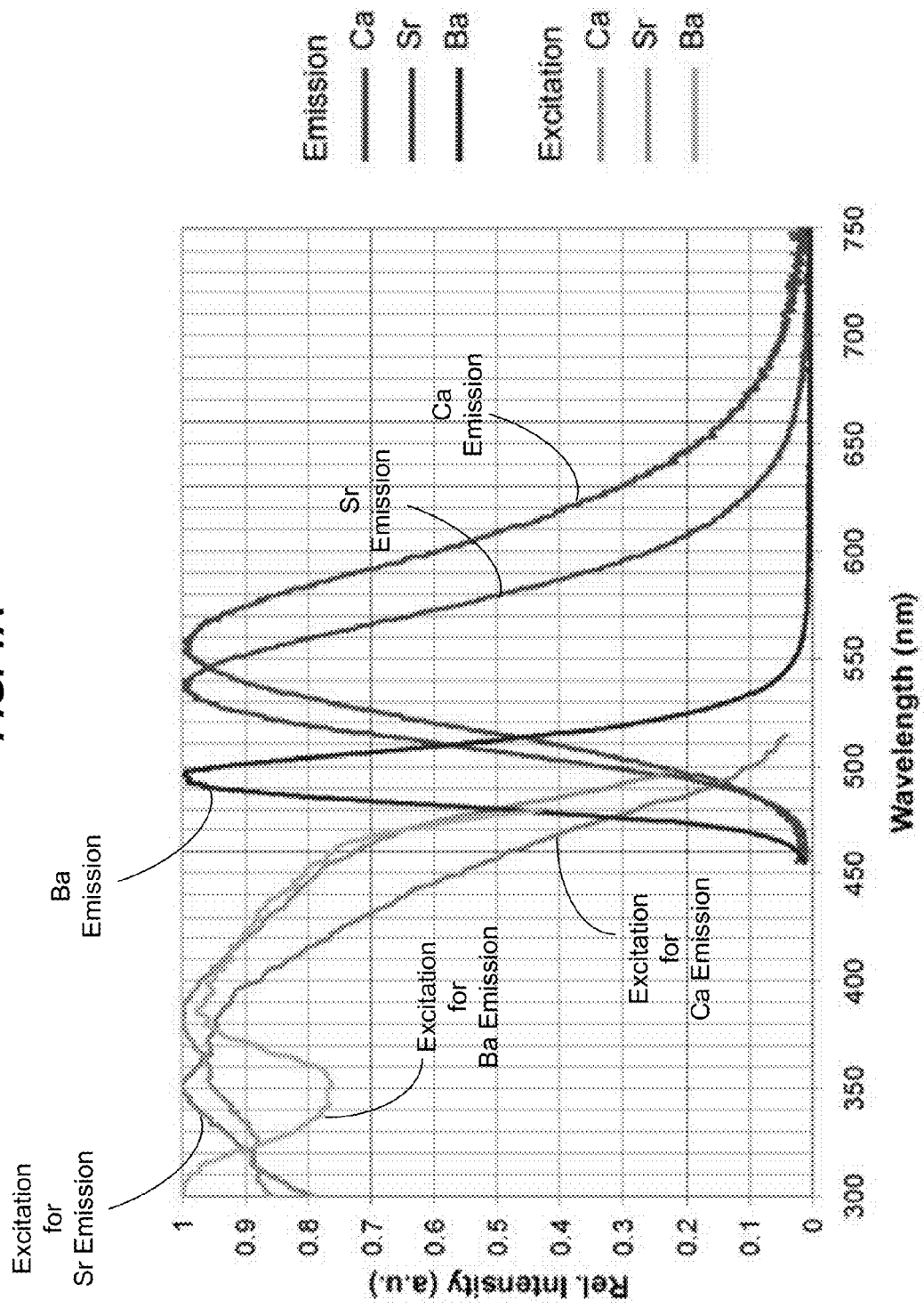
FIGS. 1A and 1B illustrate optical absorption and emission spectra of phosphors with different compositions.

A phosphor material described in this patent document can include one or more active phosphor materials that emit visible light of a desired color by absorbing the excitation light. A transition metal compound is commonly used as an active phosphor material in which transition metal ions are the activators and emit the desired visible light. Devices that use phosphor materials to produce visible light may be configured to produce visible light at a particular desired color or a proper mixture of different specific colors such as white light. For example, white LED light sources can be designed to combine visible light of different colors (e.g., red, green and blue) emitted by different phosphor materials excited by LED light to produce the while output light. For another example, a screen formed of different phosphor regions that emit light of different colors, respectively, when illuminated by excitation light can be used to display color images.

Phosphor materials described in this document can be used in the above and other applications and are composite phosphor materials that include two or more different transition metal compounds that, under optical excitation of the same excitation light, emit visible light at spectrally close but different spectral wavelengths or bands that spectrally overlap to produce a desired color. Such a composite phosphor material can be used alone to produce light of the desired color or be combined with another light to produce mixed light. In addition, a composite phosphor material designed for emitting visible light of a particular color may include one or more additive materials that mix with the two or more different transition metal compounds to achieve certain material properties.

One technical benefit of using a composite phosphor material having two or more different transition metal compounds is the ability to control the selection of the transition metal compounds and their relative amounts to achieve the desired color in the output light produced by the composite phosphor material. As such, the color of the light is not limited by the natural colors of transition metal ions and a wide range of colors can be generated by selecting the proper composite phosphor material. In applications where the color of the visible light is produced by mixing visible light of two or more different colors, the freedom in selecting certain colors of the different colors may be limited so that a particular color may have to be set at a particular wavelength or wavelength range based on the colors of other light in the mixture in order to achieve the desired color in the combined light. In such applications, using composite phosphor materials as described in this document provides this ability to set a particular color may at a particular wavelength or wavelength range.

Consider an example for producing color light by mixing red, green and blue light. The choices for the wavelengths for the green and blue light tend to be limited either because the light sources (such as LEDs or laser diodes) that directly emit green and blue light or because the phosphor materials that emit green and blue light are limited. Therefore, there exits the need to provide composite phosphor materials that emit red light at various wavelengths in the red color region to allow the red color to be fine tuned to produce the desired color in mixing the red, green and blue light. Various composite phosphor materials for emitting red light are provided in this document to allow tuning the red color by controlling the compositions of the transition metal compounds and their relative amounts in designing phosphors in LED-based lighting devices and display screens.

Various transition metal compounds used in phosphor materials can be more expensive than others. Therefore, another benefit of using composite phosphor materials for emitting red light is to use as much as possible one or more relatively inexpensive transition metal compounds in designing a particular red-emitting composite phosphor material while still achieving the desired color and other performance metrics for the specific application to reduce the overall cost of the composite phosphor material. This aspect of the techniques described in this document can be important for practical commercialization of certain phosphor-based technologies such as display screens for large format display systems where large quantities of phosphor materials are needed for large display areas (e.g., greater than 100 inches in dimension).

Phosphor materials based on Ba, Ca and Sr nitrides with the Eu activator are known materials for emitting red light under optical excitation by UV light, including light at or near 405 nm in wavelength. Such red-emitting Ba, Ca and Sr nitride phosphors with the Eu activator can be used with green and blue light to produce desired colors under certain color gamut requirements (e.g., the NTSC/PAL color gamut requirements) for display and other applications. In addition, red-emitting Ba, Ca and Sr nitride phosphors with the Eu activator are known to exhibit good performance in thermal quenching and can operate at elevated temperatures (e.g., at or above 150 to several hundred degrees cesium) while still maintaining sufficient light emission efficiency. In various LED-based lighting devices that generally operate at elevated temperatures, red-emitting Ba, Ca and Sr nitride phosphors with the Eu activator and other nitride phosphors become the red-emitting phosphors of choice.

However, Ba, Ca and Sr nitride phosphors with the Eu activator and other red-emitting nitride phosphors are generally expensive. For example, the prices for red-emitting nitride phosphors are significantly higher than prices of silicate phosphors that emit light in the red-orange spectral range at wavelengths shorter than the emission wavelengths of red-emitting nitride phosphors. Some Ba, Ca and Sr nitride phosphors with the Eu activator are sold at prices that are tens or over 50 times (e.g., 50 times) higher than some silicate phosphors.

Red-emitting phosphors disclosed in this document include composite phosphors that mix red-emitting nitride phosphors and silicate phosphors to emit red light with an emission wavelength at the peak that is shorter than a wavelength of the red-emitting nitride phosphors to increase the perceived brightness of the red emission while maintaining the proper NTSC/PAL color gamut requirements. Such nitride-silicate composite phosphors can reduce the phosphor cost by adding lower cost silicate phosphors and reducing the amounts of the high cost red-emitting nitride phosphors. Because nitride phosphors and silicate phosphors have different absorption spectral profiles in absorbing the excitation light, the compositions of such nitride-silicate composite phosphors can be designed to optimize the optical excitation efficiency at a particular excitation wavelength. In addition, the composition of such a nitride-silicate composite phosphor can be formulated to maintain sufficient performance in thermal quenching for certain LED devices and phosphor display devices that operate phosphors at temperatures lower than some elevated temperatures in some LED devices that require high-temperature thermal quenching performance of expensive red-emitting nitride phosphors.

FIG. 1A shows optical absorption and emission spectral profiles of three different nitride phosphor materials with emission peaks at different wavelengths: a Ca nitride phosphor Ca $Si_2O_2N_2$:Eu, a Si nitride phosphor Sr $Si_2O_2N_2$:Eu and a Ba nitride phosphor $BaSi_2O_2N_2$:Eu. Different combinations of transition metal ions Ca, Si and Ba cause different emission wavelengths and spectral profiles. The optical absorption profiles of the three nitride phosphors for absorbing excitation light are also provided in FIG. 1A. Hence, different combinations of transition metal ions can be used to generate emission in different colors, e.g., red, green and blue.

Instead of using one phosphor for emission of light at a desired color, a composite phosphor material for a particular color emission includes two or more different phosphor materials (transition metal compounds) that absorb excitation light at a given excitation wavelength to emit visible light at spectrally close but different spectral wavelengths or bands that spectrally overlap to produce a desired color. As indicated in FIG. 1A, different phosphor compositions can have different but overlapping optical absorption spectral profiles and this aspect can be used to use the mixture of different phosphors to optimize the efficiency of optical absorption of the excitation light while producing a desired output color by combining the different but overlapping emissions of the different phosphors.

Figure 1B:
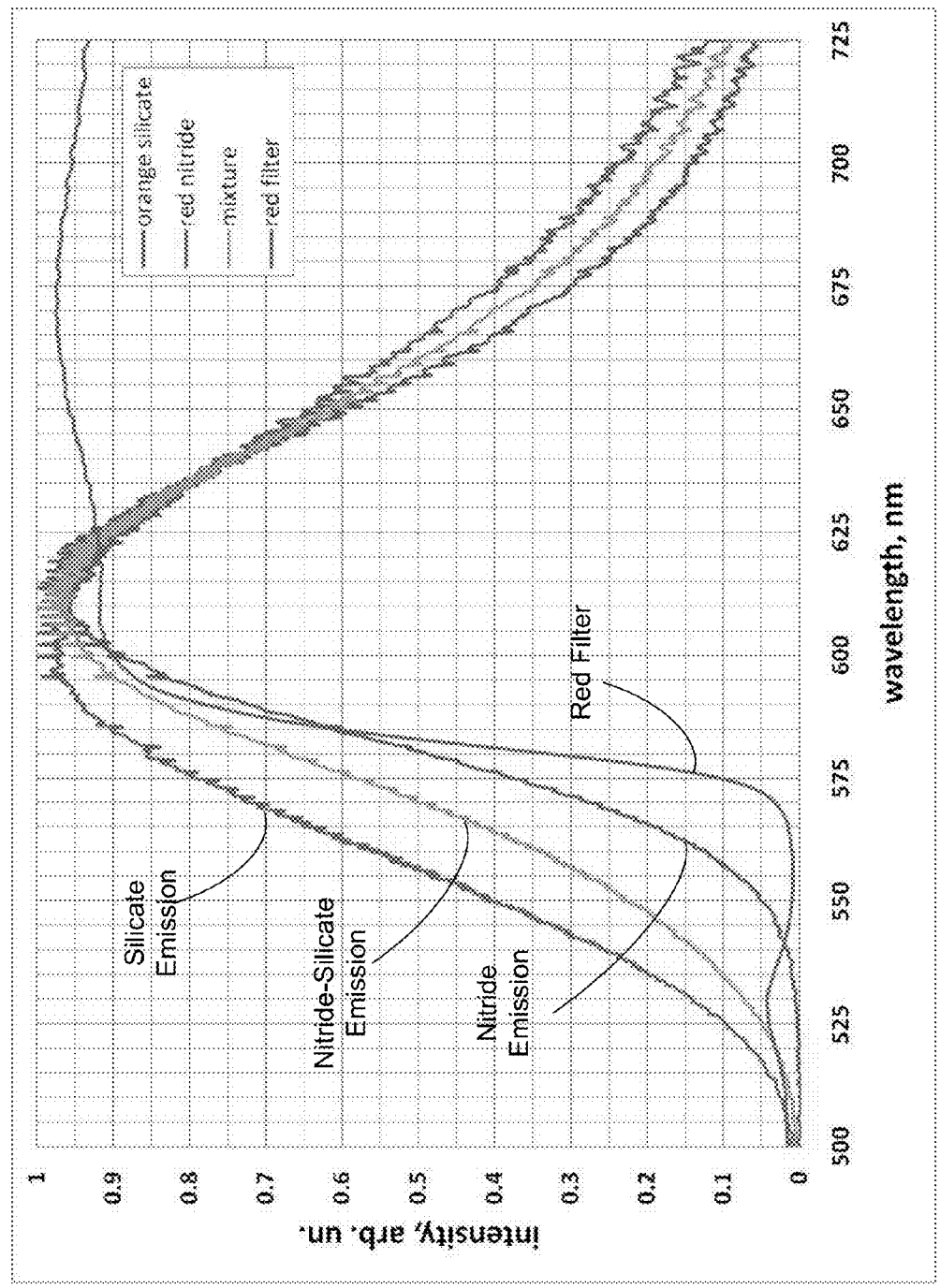

FIG. 1B shows an example of optical emission spectral profiles of a nitride phosphor and a silicate phosphor under a common excitation light of 405 nm. The nitride phosphor is a red-emitting phosphor with an emission peak around 615-630 nm and the silicate phosphor is a near red-emitting phosphor that has its emission peak on the short wavelength side ("orange color" side) around 600-610 nm. A mixture of such silicate and nitride phosphors can be used to produce a red emission profile between those of the two phosphors as illustrated by an example labeled as "Nitride-Silicate Emission" in FIG. 1B. The emission peak of this mixture phosphor is between 600 nm and 620 nm. Adding the silicate phosphor shifts the emission from 615-630 nm to the shorter wavelength but the mixture is designed to maintain the shifted emission peak in the red region to comply with the NTSC/PAL color gamut requirements. As such, without significantly compromising the color purity under the NTSC/PAL color gamut requirements, the shift in emission wavelength by adding the silicate phosphor increases the perceived brightness of the emitted red color by human eyes. This shift can be controlled by controlling the composition of the mixture or the ratio between the nitride phosphor and silicate phosphor to place the shifted red emission peak at a particular red wavelength desired for an application, e.g., matching with the fixed blue and green colors to produce the proper color gamuts. Since the amount of the nitride phosphor is reduced in the composite phosphor relative to the pure nitride phosphor, the cost is reduced.

To further augment the red emission profile produced by the composite phosphor in FIG. 1B, an additional ref color filtering can be implemented to shape the red emission profile in some implementations. This can be achieved by, in one implementation, using a red optical filter that spatially overlaps with a region where the red-emitting composite phosphor is located to filter the emitted light. This filtering can also be achieved by adding to the composite phosphor an optical filtering material with a desired red absorption spectral profile. In FIG. 1B, a spectral transmission of a red filter is shown to shape the emission profile of the Nitride-Silicate Emission.

Various nitride and silicate phosphors for emitting red or near-red light can be considered to construct red-emitting composite phosphors. Examples of red emitting nitride phosphors include: $(Ba,Sr,Ca)AlSiN_3$:Eu, $(Ca,Sr,Ba)Si_2O_2N_2$:Eu, and $(Ca,Sr,Ba)_2Si_5N_8$:Eu, and $(Ba,Ca,Sr,Eu)_2Si_5N_{8-2x}O_xC_x$, where $0 \leq Sr_3N_2 < 0.46$, $0 \leq Ba_3N_2 < 0.56$, $0 \leq Ca_3N_2 < 0.30$, $0 < Si_3N_4 < 0.7$, $0 < EuO < 0.38$, $0 < SiC \leq 0.12$. The materials $Sr_3N_2$, $Ba_3N_2$, $Ca_3N_2$, $Si_3N_4$, EuO and SiC are compounds that are present in the final compound $(Ba,Ca,Sr,Eu)_2Si_5N_{8-2x}O_xC_x$. Examples of near red-emitting silicate phosphors include $(Sr,Ba,Ca)_2SiO_4$:Eu, $(Ba,Mg,Eu,Mn)_4Si_2O_8$, $(Ba,Sr,Ca)_3SiO_5$:Eu, $(Sr, Ba, Ca)_2SiO_4$:Eu in which $0 \leq Ba < 0.35$, $0 \leq Ca < 0.20$, $0 < Eu < 0.55$, $0.1 < Sr < 0.65$, $(Ba, Sr, Ca)_3SiO_5$:Eu in which $0 < Ba < 0.82$, $0 \leq Ca < 0.57$, $0 < Eu < 0.84$, $0.1 < Sr < 0.75$, and $(Ba, Mg, Eu, Mn)_4Si_2O_8$, where: $0.3 \leq Ba \leq 0.80$, $0.02 \leq Mg \leq 0.1$, $0 < Eu \leq 0.25$, $0 < Mn < 0.1$.

Based on these nitride and silicate phosphors, red-emitting composite phosphors can be formed based on specific needs of phosphor applications. In general, a red-emitting composite phosphor can include one or more nitride phosphors and one or more silicate phosphors. For example, the weight percentage of the one or more nitride phosphors can be 90% to 10% of the total weight of the composite phosphor while the weight percentage of the one or more silicate phosphors can be 10% to 90% of the composite phosphor. The relative weight ratio between the one or more silicate phosphors and the one or more nitride phosphors can be 1:1 (equal amounts) or other ratios depending on the needs in specific applications of such composite phosphors. For example, in some examples, the total amount of the one or more silicate phosphors is set to be equal to the total amount of the one or more nitride phosphors (equal amounts) to produce a desired red color for increasing or maximizing the number of possible colors that can be generated when mixing with blue and green colors. Referring back to the example in FIG. 1B, the relative ratios between the one or more silicate phosphors and the one or more nitride phosphors can be in part determined by the effective emission wavelength of the composite phosphor. For example, a longer (and thus "darker") wavelength emission in the red zone would require a greater amount of the nitride phosphors (at an increased cost) and a shorter (and thus "brighter") wavelength emission in the red zone would require a greater amount of the silicate phosphors (at a reduced cost).

Various nitride phosphors are known to have good thermal quenching performance and thus are suitable for various LED devices with high brightness under high temperatures. Various silicate phosphors whose thermal quenching performance is less than that of the nitride phosphors are not considered as phosphor candidates for high brightness LED and other devices. For applications that operate phosphors at or near ambient temperatures or slightly elevated temperatures above the ambient, the optical emission efficiency, the emission wavelengths and the cost of the phosphor materials are more important then the thermal quenching performance. For display applications, the improved brightness by replacing a red-emitting nitride phosphor with a red-emitting nitride-silicate composite phosphor without significantly compromising the color purity and color gamut reproduction in the display devices presents a significant improvement in the overall performance of the display system while reducing the cost of the display screens, especially for large format display screens.

Scanning beam display systems that use phosphor screens to emit light under optical excitation to produce images are an example of such applications for using the disclosed composite phosphors. In one implementation, for example, three different color phosphors that are optically excitable by the UV laser beam to respectively produce light in red, green, and blue colors suitable for forming color images may be formed on the screen as pixel dots or repetitive red, green and blue phosphor stripes in parallel. The phosphor screens in such scanning beam systems generally operate at slightly elevated temperatures above the ambient temperature due to various features built into such systems, including, for example, the scanning nature of the systems, the modulation of the laser excitation beams where the laser power is modulated to be on and off to carry images while being power off during the majority of the operating period, and the screen design which is, unlike LED devices, expose the phosphor materials to the open air and spread the phosphor materials over large areas on the screens. The following sections provide technical details of such scanning beam display systems that can benefit from the composite phosphor materials.

Examples of scanning beam display systems described here use at least one scanning laser beam to excite color phosphor materials deposited on a screen to produce color images. The scanning laser beam is modulated to carry images in red, green and blue colors or in other visible colors and is controlled in such a way that the laser beam excites the color phosphor materials in red, green and blue colors with images in red, green and blue colors, respectively. Hence, the scanning laser beam carries the images but does not directly produce the visible light seen by a viewer. Instead, the color light-emitting phosphor materials on the screen absorb the energy of the scanning laser beam and emit visible light in red, green and blue or other colors to generate actual color images seen by the viewer.

Laser excitation of the phosphor materials using one or more laser beams with energy sufficient to cause the phosphor materials to emit light or to luminesce is one of various forms of optical excitation. In other implementations, the optical excitation may be generated by a non-laser light source that is sufficiently energetic to excite the phosphor materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm (e.g., around 405 nm). In the examples described below, Violet or a UV laser beam is used as an example of the excitation light for a phosphor material or other fluorescent material and may be light at other wavelength.

Figure 1C:
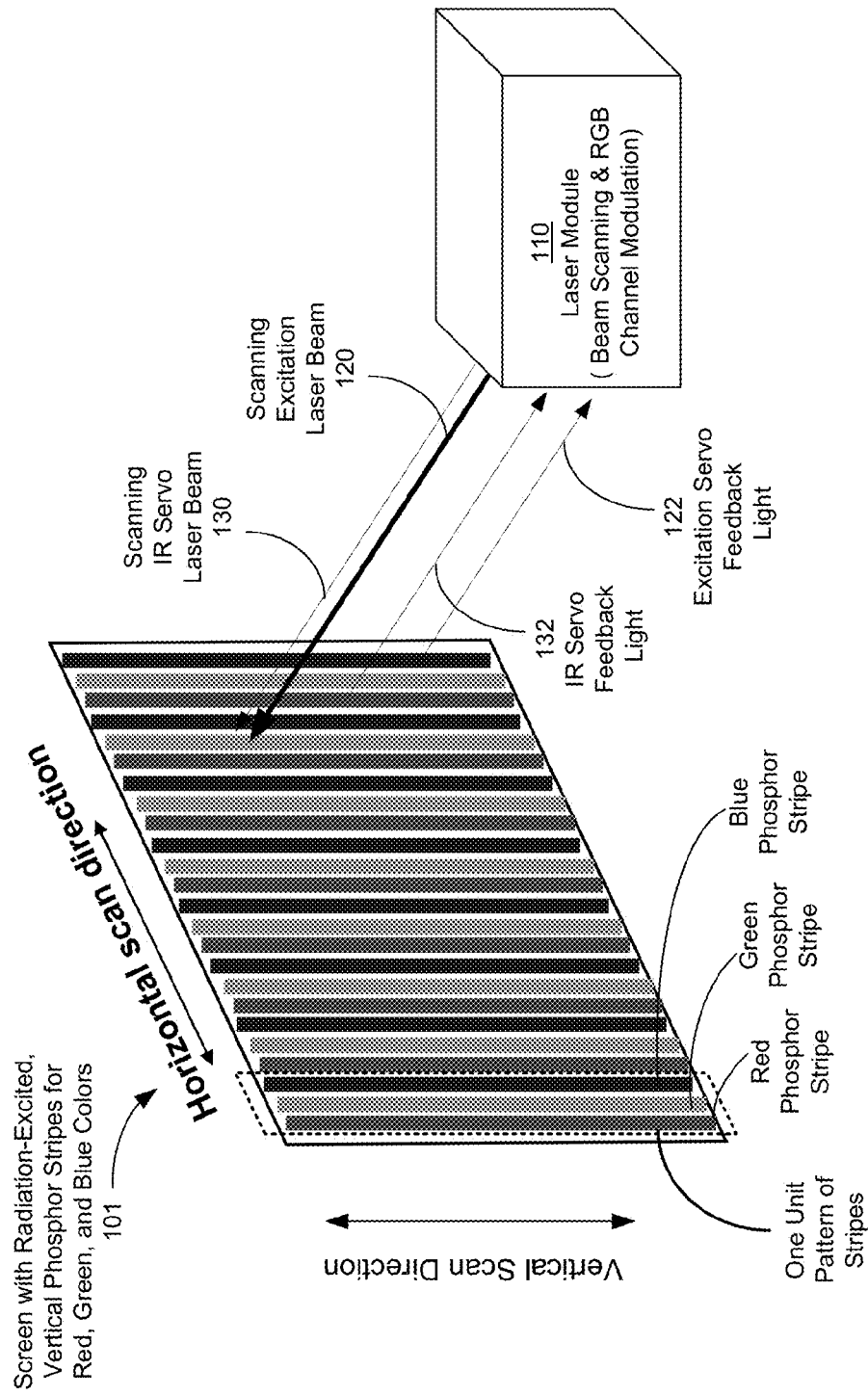
FIG. 1C shows an example scanning laser display system having a light-emitting screen made of laser-excitable phosphor materials (e.g., phosphors) emitting colored lights under excitation of a scanning laser beam that carries the image information to be displayed.

FIG. 1C illustrates an example of a laser-based display system using a screen having color phosphor stripes. Alternatively, color pixilated light-emitting areas may also be used to define the image pixels on the screen. The system includes a laser module 110 to produce and project at least one scanning laser beam 120 onto a screen 101. The screen 101 has parallel color phosphor stripes in the vertical direction and two adjacent phosphor stripes are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1C as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range below 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear scanning systems where the viewer and the laser module 110 are on the opposite sides of the screen 101. Alternatively, such display systems may be configured as front scanning systems where the viewer and laser module 110 are on the same side of the screen 101.

The screen 101 can be made to support large display format, e.g., with a screen dimension greater than 100 inches. Large display formats can also be constructed by using multiple such display systems in FIG. 1C to stack the screens 101 together to form a composite large screen. Each screen 101 within the composite large screen is illuminate by its respective laser module 110. In both single screen implementation and multi-screen implementation, the total amounts of the phosphors for emitting the red, green and blue light are increased with the size of the final display format. Hence, the cost of the phosphors can impact the commercial deployment of such systems.

Examples of implementations of various features, modules and components in the scanning laser display system in FIG. 1C are described in PCT Patent Application No. PCT/US2007/004004 entitled "Servo-Assisted Scanning Beam Display Systems Using Fluorescent Screens" and filed on Feb. 15, 2007 (PCT Publication No. WO 2007/095329), PCT Patent Application No. PCT/US2007/068286 entitled "Phosphor Compositions for Scanning Beam Displays" and filed on May 4, 2007 (PCT Publication No. WO 2007/131195), PCT Patent Application No. PCT/US2007/68989 entitled "Multilayered Fluorescent Screens for Scanning Beam Display Systems" and filed on May 15, 2007 (PCT Publication No. WO 2007/134329), and PCT Patent Application No. PCT/US2006/041584 entitled "Optical Designs for Scanning Beam Display Systems Using Fluorescent Screens" and filed on Oct. 25, 2006 (PCT Publication No. WO 2007/050662). The disclosures of the above-referenced patent applications are incorporated by reference in their entirety as part of the specification of this application.

Figure 2A:
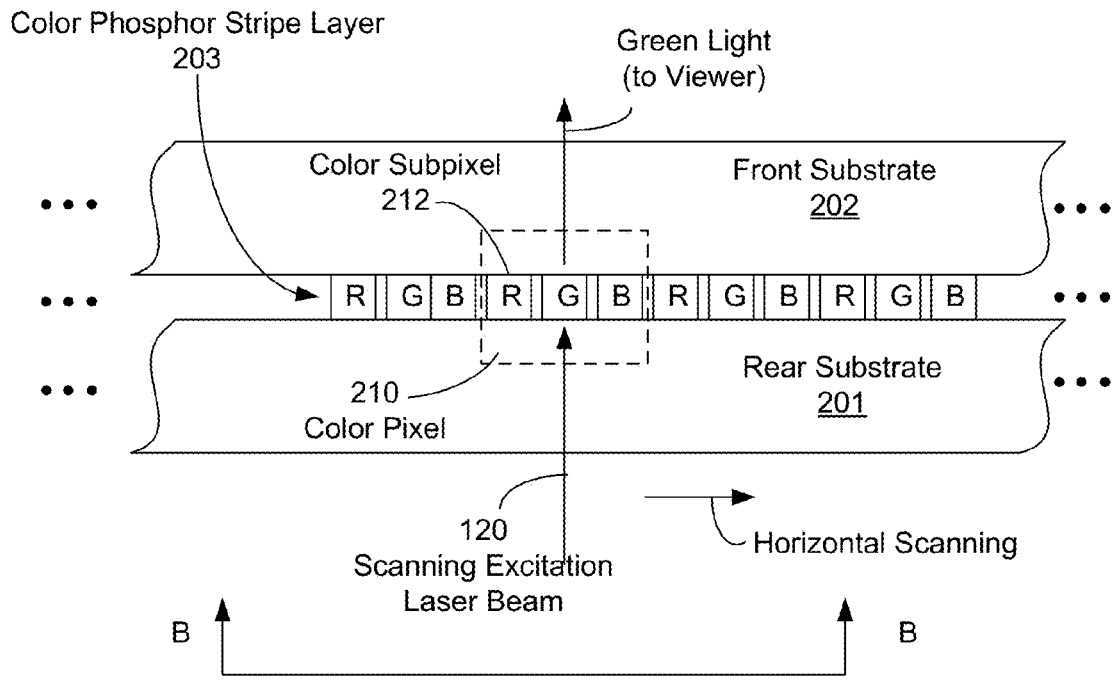
FIGS. 2A and 2B show one example screen structure with parallel light-emitting stripes and the structure of color pixels on the screen in FIG. 1C.

FIG. 2A shows an exemplary design of the screen 101 in FIG. 1C. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear scanning configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. The rear substrate 201 can be a thin film layer and is configured to recycle the visible energy toward the viewer. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The relative alignment of the laser module 110 and the screen 101 can be monitored and controlled to ensure proper alignment between the laser beam 120 and each pixel position on the screen 101. In one implementation, the laser module 110 can be controlled to be fixed in position relative to the screen 101 so that the scanning of the beam 120 can be controlled in a predetermined manner to ensure proper alignment between the laser beam 120 and each pixel position on the screen 101.

Figure 2B:
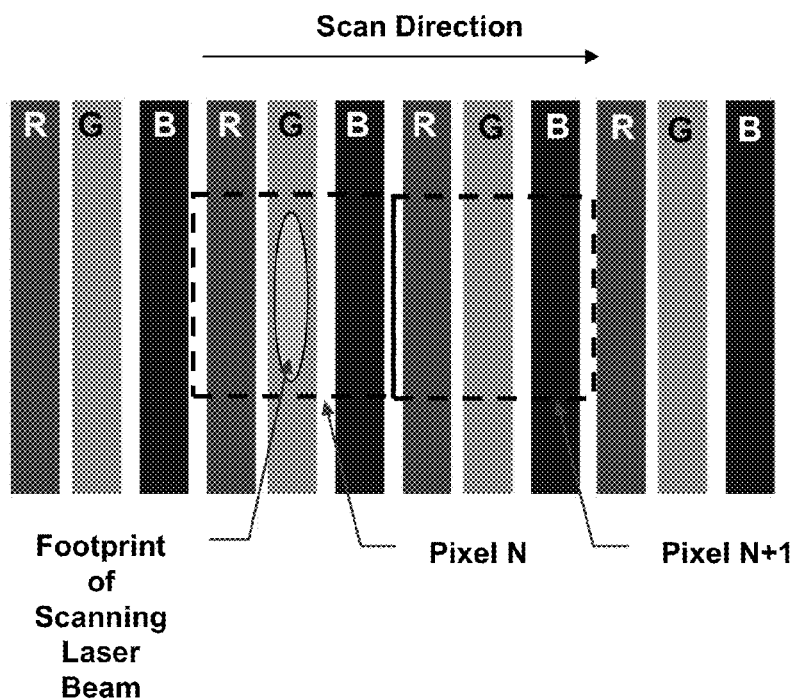

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multi-modes to ensure sufficient brightness of the screen.

Figure 3:
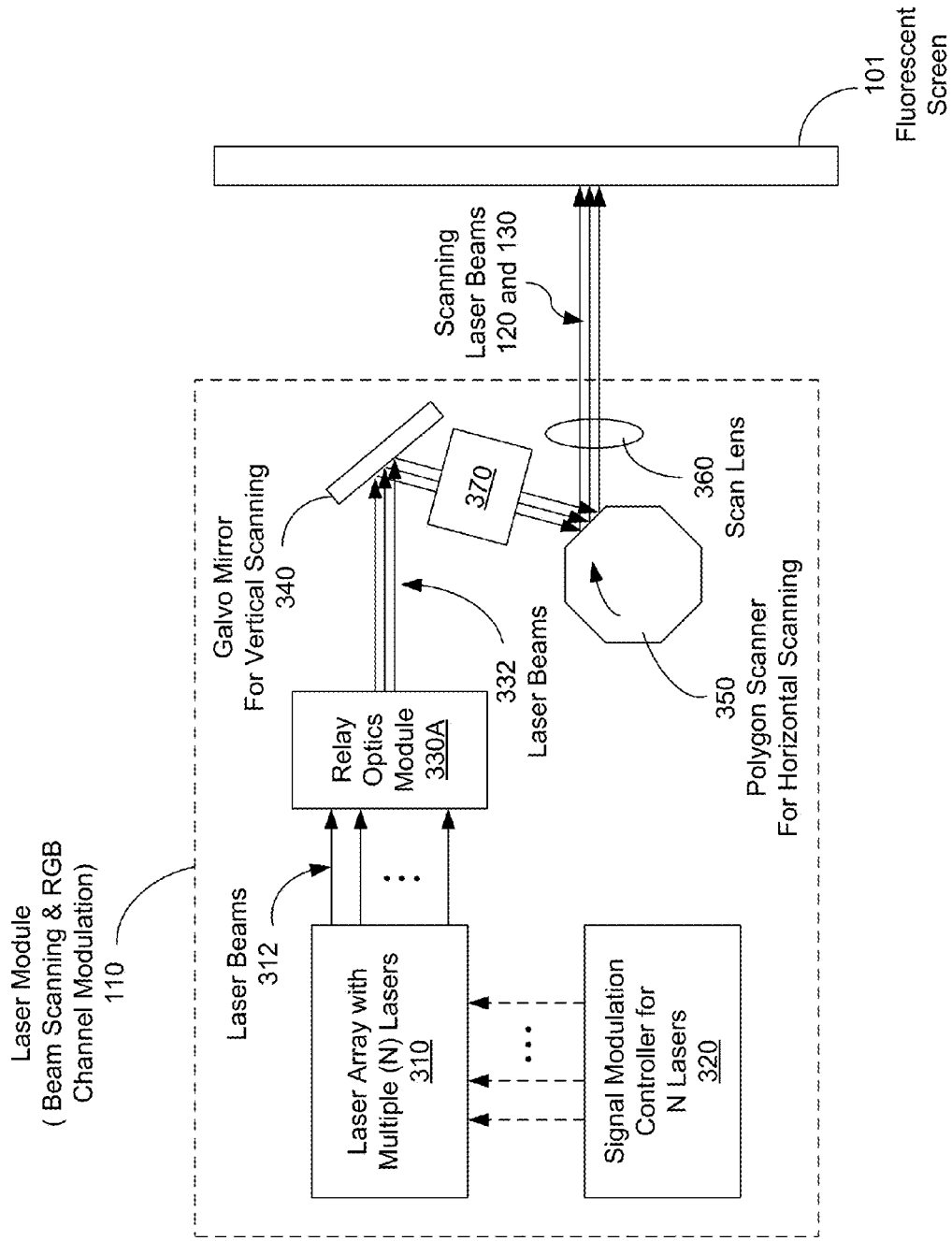
FIG. 3 shows an example implementation of the laser display system in FIG. 1C in a pre-objective scanning configuration having multiple lasers that direct multiple laser beams on the screen.

Referring now to FIG. 3, an example implementation of the laser module 110 in FIG. 1C is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors. A relay optics module 370 is inserted between the scanners 340 and 350 to image the reflective surface of the reflector in the vertical scanner 340 into a respective reflecting facet of the polygon scanner 350 in order to prevent beam walk across the thin facet of the polygon scanner 350 in the vertical direction.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101.

In one implementation, at an angular position of the galvo mirror 340, the spinning of the polygon scanner 350 causes the beams 120 from N lasers in the laser array 310 to scan one screen segment of N adjacent horizontal lines on the screen 101. The galvo mirror 340 tilts linearly to change its tiling angle at a given rate along a vertical direction from the top towards the bottom during the scanning by the polygon until the entire screen 101 is scanned to produce a full screen display. At the end of the galvo vertical angular scan range, the galvo retraces to its top position and the cycle is repeated in synchronization with the refresh rate of the display.

In another implementation, for a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At the end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

In the above example of a scanning beam display system shown in FIG. 3, the scan lens 360 is located downstream from the beam scanning devices 340 and 350 and focuses the one or more scanning excitation beams 120 onto the screen 101. This optical configuration is referred to as a "pre-objective" scanning system. In such a pre-objective design, a scanning beam directed into the scan lens 360 is scanned along two orthogonal directions. Therefore, the scan lens 360 is designed to focus the scanning beam onto the screen 101 along two orthogonal directions. In order to achieve the proper focusing in both orthogonal directions, the scan lens 360 can be complex and, often, are made of multiples lens elements. In one implementation, for example, the scan lens 360 can be a two-dimensional f-theta lens that is designed to have a linear relation between the location of the focal spot on the screen and the input scan angle (theta) when the input beam is scanned around each of two orthogonal axes perpendicular to the optic axis of the scan lens. The two-dimensional scan lens 360 such as a f-theta lens in the pre-objective configuration can exhibit optical distortions along the two orthogonal scanning directions which cause beam positions on the screen 101 to trace a curved line. The scan lens 360 can be designed with multiple lens elements to reduce the bow distortions and can be expensive to fabricate.

To avoid the above distortion issues associated with a two-dimensional scan lens in a pre-objective scanning beam system, a post-objective scanning beam display system can be implemented to replace the two-dimensional scan lens 360 with a simpler, less expensive 1-dimensional scan lens. U.S. patent application Ser. No. 11/742,014 entitled "POST-OBJECTIVE SCANNING BEAM SYSTEMS" and filed on Apr. 30, 2007 (U.S. Pat. No. 7,697,183) describes examples of post-objective scanning beam systems suitable for use with phosphor screens described in this application and is incorporated by reference as part of the specification of this application.

Figure 4:
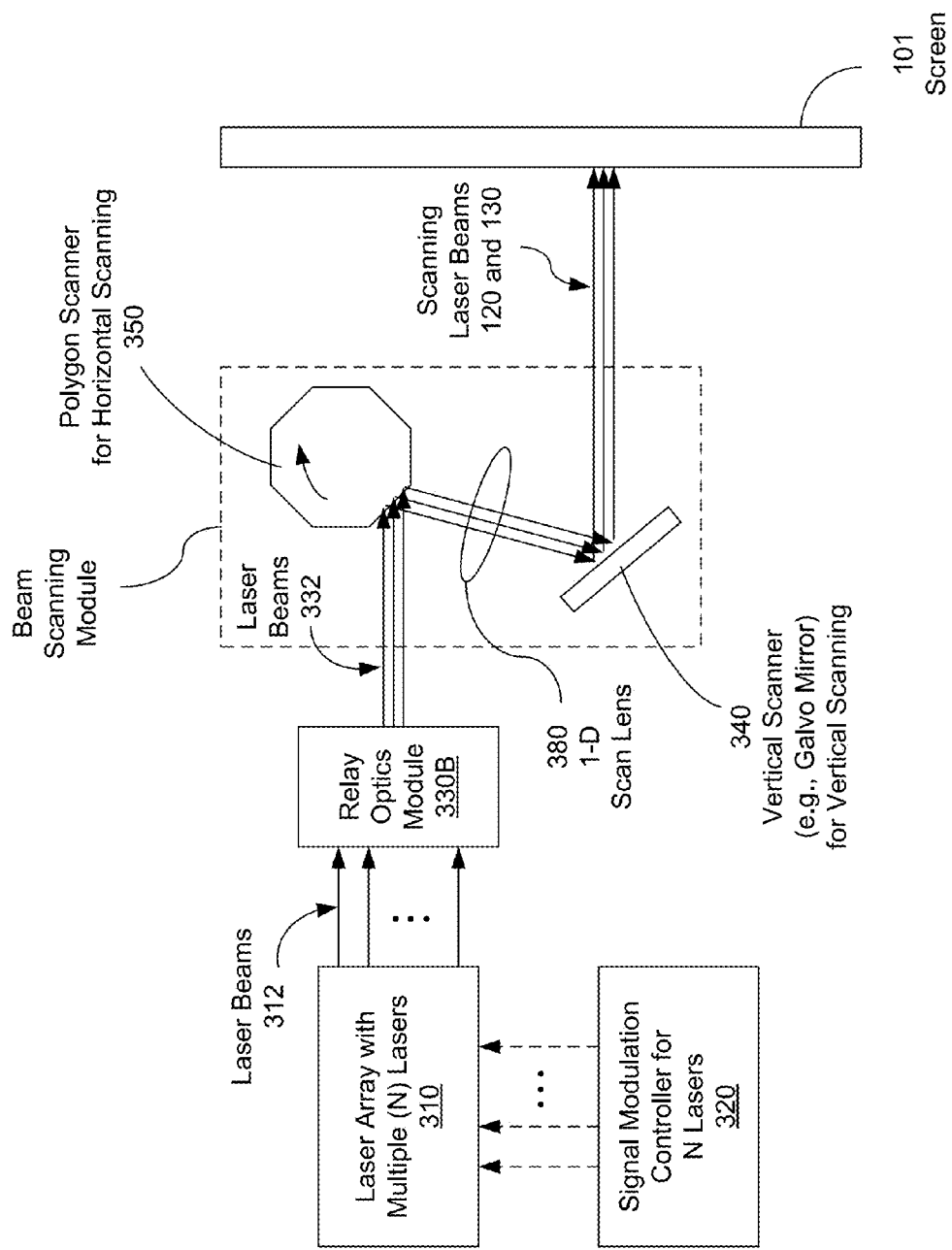
FIG. 4 shows an example implementation of a post-objective scanning beam display system based on the laser display system in FIG. 1C.

FIG. 4 shows an example implementation of a post-objective scanning beam display system based on the system design in FIG. 1C. A laser array 310 with multiple lasers is used to generate multiple laser beams 312 to simultaneously scan a screen 101 for enhanced display brightness. A signal modulation controller 320 is provided to control and modulate the lasers in the laser array 310 so that the laser beams 312 are modulated to carry the image to be displayed on the screen 101. The beam scanning is based on a two-scanner design with a horizontal scanner such as a polygon scanner 350 and a vertical scanner such as a galvanometer scanner 340. Each of the different reflective facets of the polygon scanner 350 simultaneously scans N horizontal lines where N is the number of lasers. A relay optics module 330 reduces the spacing of laser beams 312 to form a compact set of laser beams 332 that spread within the facet dimension of the polygon scanner 350 for the horizontal scanning. Downstream from the polygon scanner 350, there is a 1-D horizontal scan lens 380 followed by a vertical scanner 340 (e.g., a galvo mirror) that receives each horizontally scanned beam 332 from the polygon scanner 350 through the 1-D scan lens 380 and provides the vertical scan on each horizontally scanned beam 332 at the end of each horizontal scan prior to the next horizontal scan by the next facet of the polygon scanner 350. The vertical scanner 340 directs the 2-D scanning beams 390 to the screen 101.

Under this optical design of the horizontal and vertical scanning, the 1-D scan lens 380 is placed downstream from the polygon scanner 140 and upstream from the vertical scanner 340 to focus each horizontal scanned beam on the screen 101 and minimizes the horizontal bow distortion to displayed images on the screen 101 within an acceptable range, thus producing a visually "straight" horizontal scan line on the screen 101. Such a 1-D scan lens 380 capable of producing a straight horizontal scan line is relatively simpler and less expensive than a 2-D scan lens of similar performance. Downstream from the scan lens 380, the vertical scanner 340 is a flat reflector and simply reflects the beam to the screen 101 and scans vertically to place each horizontally scanned beam at different vertical positions on the screen 101 for scanning different horizontal lines. The dimension of the reflector on the vertical scanner 340 along the horizontal direction is sufficiently large to cover the spatial extent of each scanning beam coming from the polygon scanner 350 and the scan lens 380. The system in FIG. 4 is a post-objective design because the 1-D scan lens 380 is upstream from the vertical scanner 340. In this particular example, there is no lens or other focusing element downstream from the vertical scanner 340.

Notably, in the post-objective system in FIG. 4, the distance from the scan lens to a location on the screen 101 for a particular beam varies with the vertical scanning position of the vertical scanner 340. Therefore, when the 1-D scan lens 380 is designed to have a fixed focal distance along the straight horizontal line across the center of the elongated 1-D scan lens, the focal properties of each beam must change with the vertical scanning position of the vertical scanner 380 to maintain consistent beam focusing on the screen 101. In this regard, a dynamic focusing mechanism can be implemented to adjust convergence of the beam going into the 1-D scan lens 380 based on the vertical scanning position of the vertical scanner 340.

For example, in the optical path of the one or more laser beams from the lasers to the polygon scanner 350, a stationary lens and a dynamic refocus lens can be used as the dynamic focusing mechanism. Each beam is focused by the dynamic focus lens at a location upstream from the stationary lens. When the focal point of the lens coincides with the focal point of the lens, the output light from the lens is collimated. Depending on the direction and amount of the deviation between the focal points of the lenses, the output light from the collimator lens toward the polygon scanner 350 can be either divergent or convergent. Hence, as the relative positions of the two lenses along their optic axis are adjusted, the focus of the scanned light on the screen 101 can be adjusted. A refocusing lens actuator can be used to adjust the relative position between the lenses in response to a control signal. In this particular example, the refocusing lens actuator is used to adjust the convergence of the beam directed into the 1-D scan lens 380 along the optical path from the polygon scanner 350 in synchronization with the vertical scanning of the vertical scanner 340. The vertical scanner 340 in FIG. 4 scans at a much smaller rate than the scan rate of the first horizontal scanner 350 and thus a focusing variation caused by the vertical scanning on the screen 101 varies with time at the slower vertical scanning rate. This allows a focusing adjustment mechanism to be implemented in the system of FIG. 1C with the lower limit of a response speed at the slower vertical scanning rate rather than the high horizontal scanning rate.

The beams 120 on the screen 101 are located at different and adjacent vertical positions with two adjacent beams being spaced from each other on the screen 101 by one horizontal line of the screen 101 along the vertical direction. For a given position of the galvo mirror 540 and a given position of the polygon scanner 550, the beams 120 may not be aligned with each other along the vertical direction on the screen 101 and may be at different positions on the screen 101 along the horizontal direction. The beams 120 can cover one portion of the screen 101.

Figure 5A:
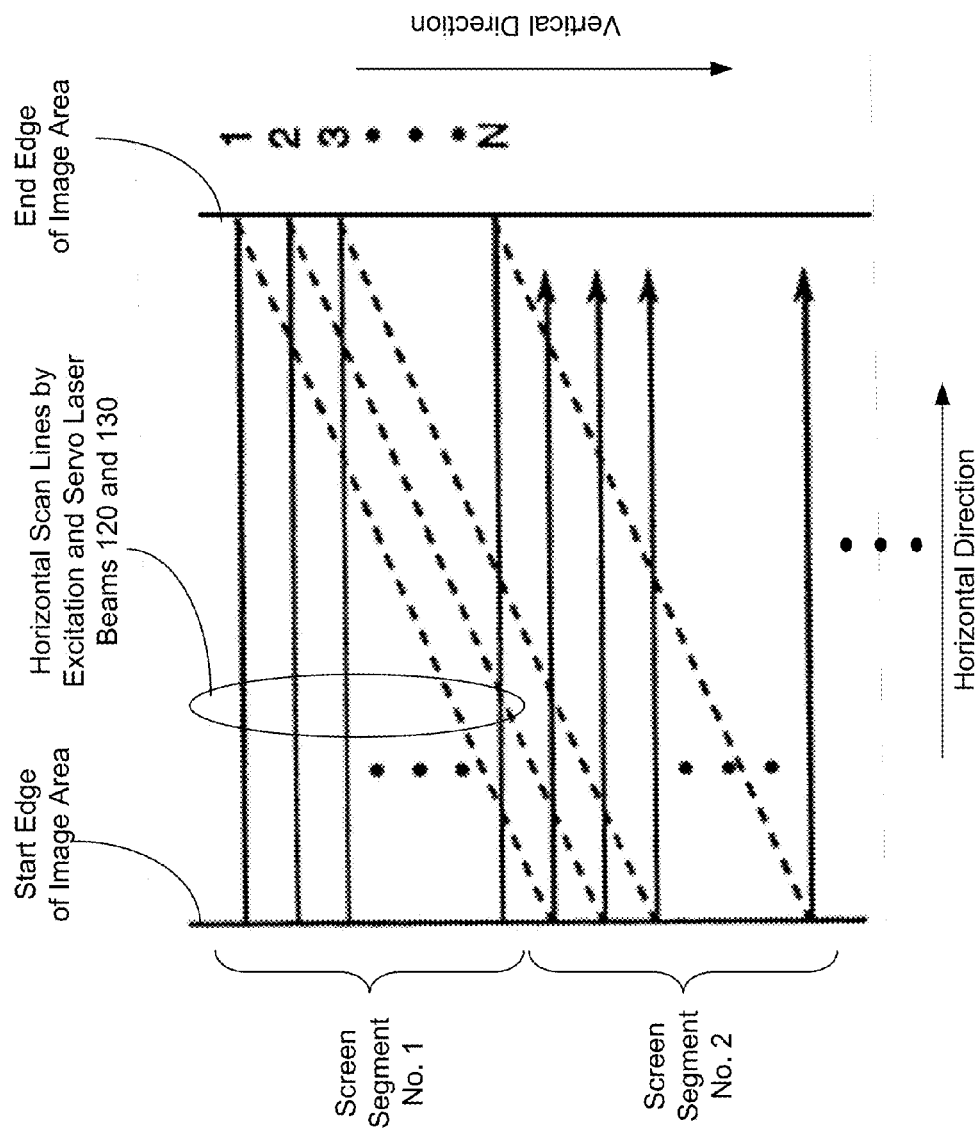
FIG. 5A shows one example for simultaneously scanning consecutive scan lines with multiple excitation laser beams and an invisible servo beam.

FIG. 5A illustrates the above simultaneous scanning of one screen segment with multiple scanning laser beams 120 at a time. Visually, the beams 120 behaves like a paint brush to "paint" one thick horizontal stroke across the screen 101 at a time to cover one screen segment between the start edge and the end edge of the image area of the screen 101 and then subsequently to "paint" another thick horizontal stroke to cover an adjacent vertically shifted screen segment. Assuming the laser array 310 has N=36 lasers, a 1080-line progressive scan of the screen 101 would require scanning 30 vertical screen segments for a full scan. Hence, this configuration in an effect divides the screen 101 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment.

In the above design with multiple laser beams, each scanning laser beam 120 scans only a number of lines across the entire screen along the vertical direction that is equal to the number of screen segments. Hence, the polygon scanner 550 for the horizontal scanning can operate at slower speeds than scanning speeds required for a single beam design where the single beam scans every line of the entire screen. For a given number of total horizontal lines on the screen (e.g., 1080 lines in HDTV), the number of screen segments decreases as the number of the lasers increases. Hence, with 36 lasers, the galvo mirror and the polygon scanner scan 30 lines per frame while a total of 108 lines per frame are scanned when there are only 10 lasers. Therefore, the use of the multiple lasers can increase the image brightness which is approximately proportional to the number of lasers used, and, at the same time, can also advantageously reduce the speed of the scanning system.

A scanning display system described in this specification can be calibrated during the manufacture process so that the laser beam on-off timing and position of the laser beam relative to the fluorescent stripes in the screen 101 are known and are controlled within a permissible tolerance margin in order for the system to properly operate with specified image quality. However, the screen 101 and components in the laser module 101 of the system can change over time due to various factors, such as scanning device jitter, changes in temperature or humidity, changes in orientation of the system relative to gravity, settling due to vibration, aging and others. Such changes can affect the positioning of the laser source relative to the screen 101 over time and thus the factory-set alignment can be altered due to such changes. Notably, such changes can produce visible and, often undesirable, effects on the displayed images. For example, a laser pulse in the scanning excitation beam 120 may hit a subpixel that is adjacent to an intended target subpixel for that laser pulse due to a misalignment of the scanning beam 120 relative to the screen along the horizontal scanning direction. When this occurs, the coloring of the displayed image is changed from the intended coloring of the image. Hence, a red pixel in the intended image may be displayed as a green pixel on the screen. For another example, a laser pulse in the scanning excitation beam 120 may hit both the intended target subpixel and an adjacent subpixel next to the intended target subpixel due to a misalignment of the scanning beam 120 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm in scanning each excitation beam 120 associated with a large screen means that an angular error can lead to a large position error on the screen. For example, if the laser beam position on the screen for a known beam angle changes over time, the result is a color shift in the image. This effect can be noticeable and thus undesirable to the viewer.

Implementations of various alignment mechanisms are provided in this specification to maintain proper alignment of the scanning beam 120 on the desired sub-pixel to achieved desired image quality. These alignment mechanisms include reference marks on the screen, both in the fluorescent area and in one or more peripheral area outside the fluorescent area, emitted visible light in red, green and blue colors by the phosphor stripes to provide feedback light that is caused by the excitation beam 120 and represents the position and other properties of the scanning beam on the screen. The feedback light can be measured by using one or more optical servo sensors to produce one or more feedback servo signals and such feedback servo signals are used to generate a location map for red, green and blue sub-pixels on the screen. A servo control in the laser module 110 processes this feedback servo signal to extract the information on the beam positioning and other properties of the beam on the screen and, in response, adjust the direction and other properties of the scanning beam 120 to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control of image color (e.g., color saturation) and image sharpness, and the beam power on the screen for control of image brightness and uniformity of the image brightness across the screen. For another example, a screen calibration procedure can be performed at the startup of the display system to measure the beam position information as a calibration map so having the exact positions of sub-pixels on the screen in the time domain. This calibration map is then used by the laser module 110 to control the timing and positioning of the scanning beam 120 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer. Examples for using servo light produced by phosphor stripe dividers from the excitation light and feedback light from other reference marks for servo control and screen calibration are described in the incorporated-by-reference PCT Patent Application No. PCT/US2007/004004 entitled "Servo-Assisted Scanning Beam Display Systems Using Fluorescent Screens" (PCT Publication No. WO 2007/095329).

The display systems in this application provide servo control mechanisms based on a designated servo beam that is scanned over the screen by the same scanning module that scans the image-carrying excitation optical beam. This designated servo beam is used to provide servo feedback control over the scanning excitation beam to ensure proper optical alignment and accurate delivery of optical pulses in the excitation beam during normal display operation. This designated servo beam has an optical wavelength different from that of the excitation beam. As an example, this designated servo beam can be an IR servo beam that may be invisible to human. The examples below use an IR servo beam 130 to illustrate features and operations of this designated servo beam.

Referring to FIG. 1C, the laser module 110 produces an invisible servo beam 130 such as an IR beam as an example of the designated servo beam. The laser module 110 scans the servo beam 130 on to the screen 101 along with the excitation beam 120. Different from the excitation beam 120, the servo beam 130 is not modulated to carry image data. The servo beam 130 can be a CW beam. The stripe dividers on the screen 101 can be made reflective to the light of the servo beam 130 and to produce feedback light 132 by reflection. The servo beam 130 has a known spatial relation with the excitation beam 120. Therefore, the positioning of the servo beam 130 can be used to determine the positioning of the excitation beam 120. This relationship between the servo beam 130 and the excitation beam 120 can be determined by using reference servo marks such as a start of line (SOL) mark in a non-viewing area of the screen 101. The laser module 101 receives and detects the feedback light 132 to obtain positioning information of the servo beam 130 on the screen 101 and uses this positioning information to control alignment of the excitation beam 120 on the screen.

The servo beam 130 is invisible to human and thus does not produce any noticeable visual artifact on the screen 101 during the normal operation of the system when images are produced on the screen 101. For example, the servo beam 130 can have a wavelength in a range from 780 nm to 820 nm. For safety concerns, the screen 101 can be made to have a filter that blocks the invisible servo beam 130 from exiting the screen 101 on the viewer side. In this regard, a cutoff absorbing filter with a bandpass transmission range only in the visible spectral range (e.g., from 420 nm to 680 nm) may be used to block the servo beam 130 and excitation beam 120. The servo control of the excitation beam 120 based on the servo beam 130 can be performed dynamically during the normal operation of the system. This servo design avoids manipulation of the image-producing excitation beam 120 during the normal display mode for servo operations and thus avoids any visual artifacts that may be caused by the servo-related manipulation of the image-producing excitation beam 120.

In addition, the scattered or reflected excitation light by the screen 101 may also be used for servo control operations during a period when the system does not show images, e.g., during the startup period of the system or when the excitation beam 120 is outside the active display area of the screen 101. In such a case, the scattered or reflected excitation light, labeled as light 122, can be used as servo feedback light for servo control of, e.g., the horizontal alignment or the vertical alignment of each laser beam 120.

In the examples of the systems in FIGS. 3 and 4, the servo beam 130 is directed along with the one or more excitation beams 120 through the same optical path that includes the relay optics module 330A or 330B, the beam scanners 340 and 350, and the scan lens 360 or 380. Referring to FIG. 5A, the servo beam 130 is scanned along with the scanning excitation beams 120 one screen segment at a time along the vertical direction of the screen. The servo beam 130 is invisible and can be overlapped with a scanning path of one excitation beam 120 or along its own scanning path that is different from a path of any of the excitation beams 120. The spatial relation between the servo beam 130 and each excitation beam 120 is known and fixed so that the positioning of the servo beam 130 on the screen 101 can be used to infer positioning of each excitation beam 120.

A light source for generating the servo beam 130 and a light source for generating an excitation beam 120 can be semiconductor lasers in a light source module which can be an array of lasers and at least one of the lasers in the laser array can be a servo laser that produces the servo beam 130. In one implementation, the location of the servo laser is known relative to each excitation laser in the laser array in the laser module 110. The servo beam 130 and each excitation beam 120 are directed through the same relay optics, the same beam scanners and the same projection lens and are projected on the screen 101. Therefore, the positioning of the servo beam 130 on the screen 101 has a known relation with the positioning of each excitation beam 120 on the screen. This relation between the servo beam 130 and each excitation beam 120 can be used to control the excitation beam 120 based on measured positioning of the servo beam 130. The relative position relation between the servo beam 130 and each excitation beam 120 can be measured using the servo feedback, e.g., during a calibration process that may be separately performed or performed during the power-up period of the system. The measured relative position relation is used for the servo feedback control.

FIG. 5B shows a map of beam positions on the screen produced by a laser array of thirty-six excitation lasers and one IR servo laser when a vertical galvo scanner and a horizontal polygon scanner are at their respective null positions in a prototype pre-objective scanning display system. The thirty-six excitation lasers are arranged in a 4×9 laser array and the IR servo laser is placed in the center of the laser array. The laser beams occupy an area of about 20 mm×25 mm on the screen. In this example, the vertical spacing is one half of a pixel between two vertically adjacent excitation lasers and the horizontal spacing between two adjacent excitation lasers is 3.54 pixels. Because the excitation lasers are spatially staggered along both horizontal and vertical directions, each scan in one screen segment produces thirty-six horizontal lines on the screen occupying thirty-six pixels along the vertical direction. In operation, these thirty-seven laser beams are scanned together based on the scanning shown in FIG. 5A to scan one screen segment at a time to sequentially scan different screen segments at different vertical positions to scan the entire screen. Because the IR servo laser is fixed in position with respect to each and every one of the thirty-six excitation lasers, the positioning of the servo beam 130 produced by the IR servo laser on the screen 101 has a known relation with respect to each beam spot of an excitation beam 120 from each of the thirty-six excitation lasers.

Figure 6:
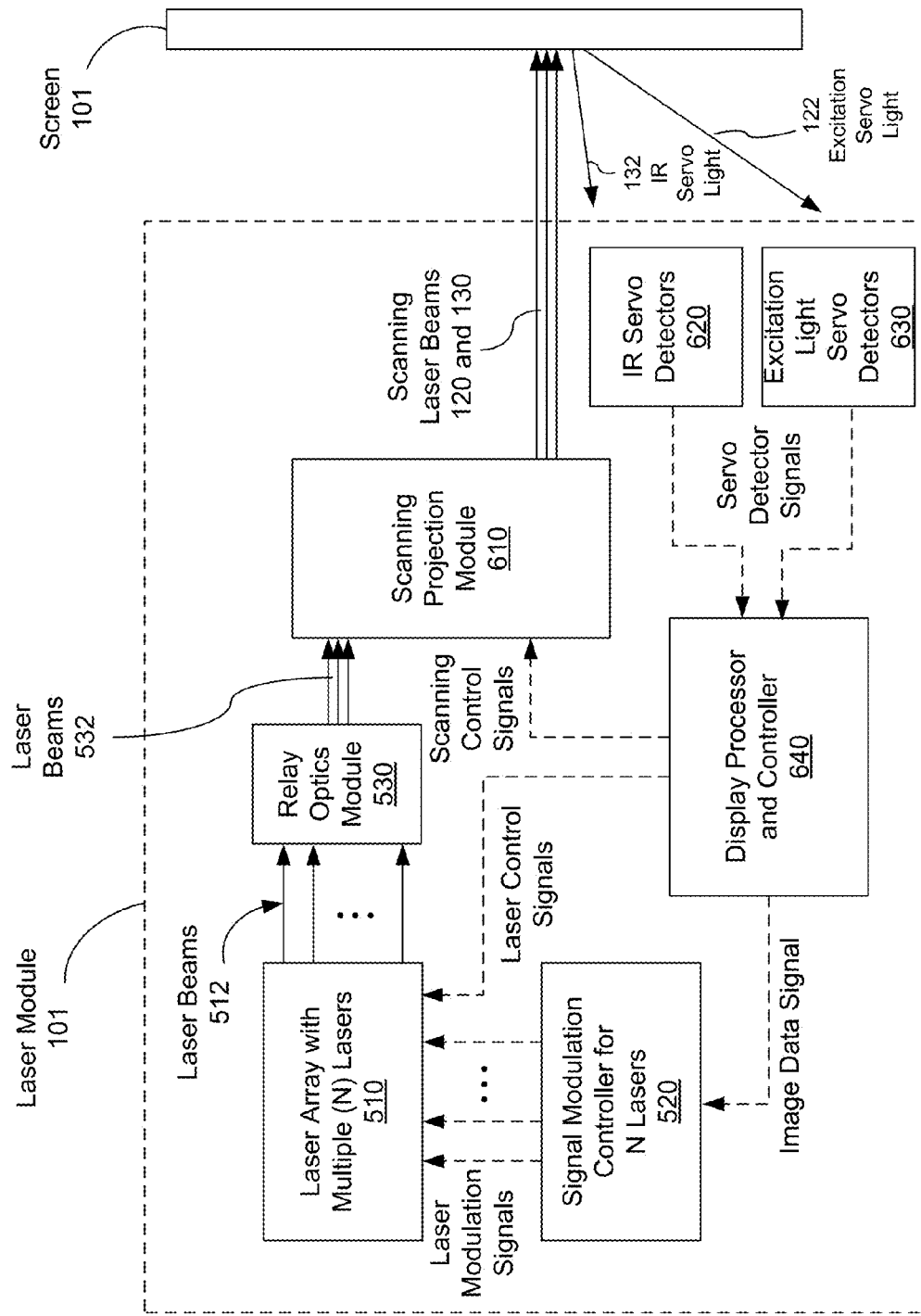
FIG. 6 shows one example of a scanning display system using a servo feedback control based on a scanning servo beam.

FIG. 6 illustrates a scanning beam display system based on a servo control using the invisible servo beam 130. A display processor and controller 640 can be used to provide control functions and control intelligence based on servo detector signals from radiation servo detectors 620 that detect servo feedback light 132 from the screen 101. A single detector 620 may be sufficient and two or more servo detectors 620 can be used to improve the servo detection sensitivity.

Similarly, one or more radiation servo detectors 630 may also be used to collect excitation servo light 122 produced by scattering or reflecting the excitation beam 120 at the screen to provide additional feedback signals to the processor and controller 640 for the servo control. This use of the servo light 122 for feedback control can be an optional feature that is used in combination with the IR servo feedback control. In some system implementations, the IR servo feedback alone without the feedback based on the feedback light 122 shown in FIG. 6 can be sufficient to align the excitation beam 120 to the proper phosphor stripes on the screen 101. Examples for using the servo light 122 produced by phosphor stripe dividers for servo control are described in the incorporated-by-reference PCT Patent Application No. PCT/US2007/004004 entitled "Servo-Assisted Scanning Beam Display Systems Using Fluorescent Screens" (PCT Publication No. WO 2007/095329).

In FIG. 6, a scanning projection module 610 is provided to scan and project the excitation and servo beams 120 and 130 onto the screen 101. The module 610 can be in a post-objective configuration or a pre-objective configuration. As illustrated, the image data is fed to the display processor and controller 640 which produces an image data signal carrying the image data to the signal modulator controller 520 for the excitation lasers 510. The servo laser which is among the excitation lasers in the array 510 is not modulated to carry image data. The signal modulation controller 520 can include laser driver circuits that produce laser modulation signals carrying image signals with image data assigned to different lasers 510, respectively. The laser control signals are then applied to modulate the lasers in the laser array 510, e.g., the currents for laser diodes to produce the laser beams 512. The display processor and controller 640 also produces laser control signals to the lasers in the laser array 510 to adjust the laser orientation to change the vertical beam position on the screen 101 or the DC power level of each laser. The display processor and controller 5930 further produces scanning control signals to the scanning projection module 610 to control and synchronize the horizontal polygon scanner and the vertical scanner.

Figure 7:
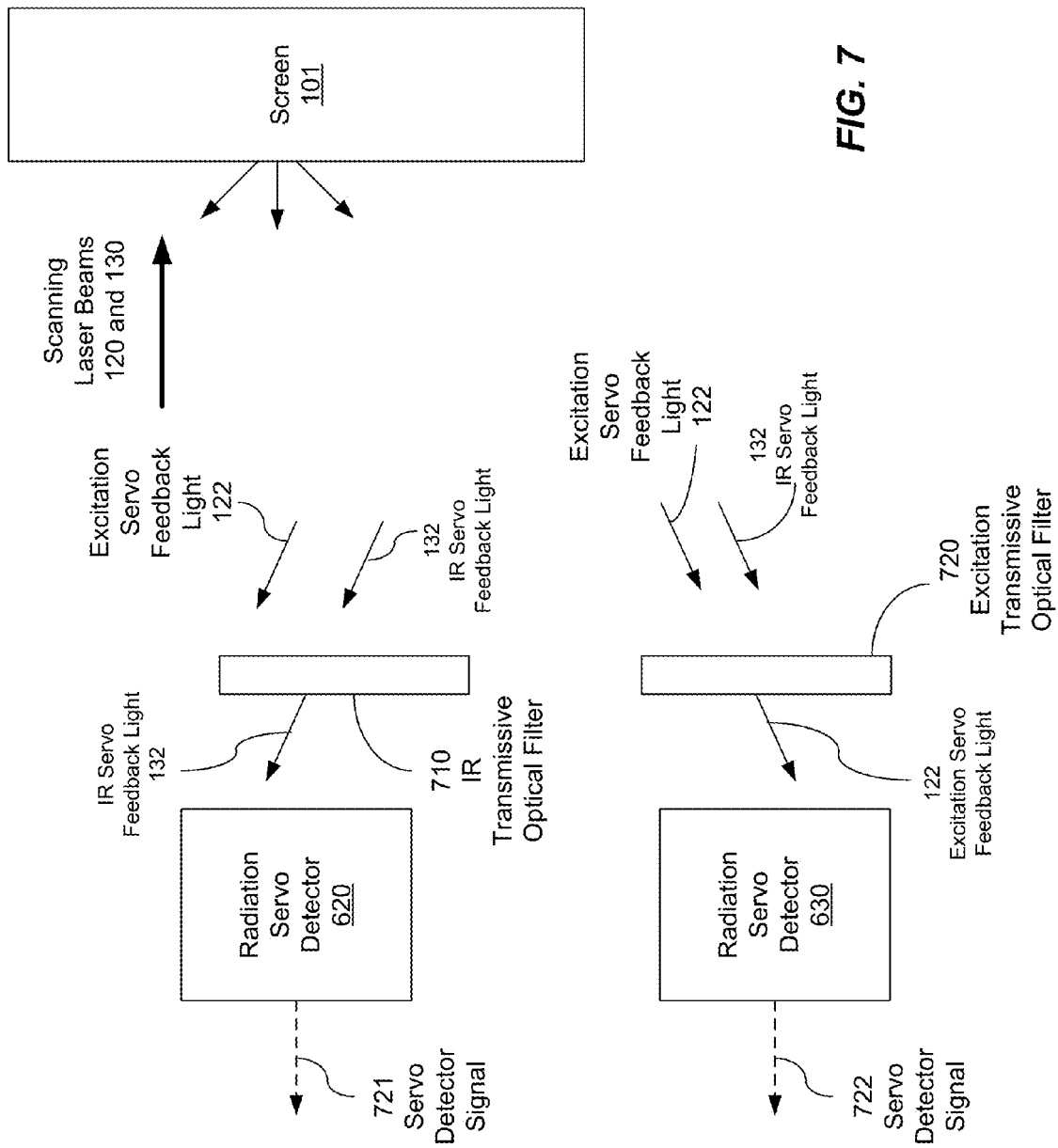
FIG. 7 shows an example of a servo detector for detecting the servo feedback light in FIG. 6.

FIG. 7 shows one example of the servo detector design where a servo detector 620 detects the servo feedback light 132. The servo detector 620 can be a detector designed to be sensitive to light of the servo beam wavelength for the invisible servo beam 130 and less sensitive to other light such as the visible light and the excitation light. An optical filter 710 can be used to filter the light from the screen 101 to selectively transmit the servo feedback light 132 while blocking light at other wavelengths, such as the excitation light and visible light. Such a filter allows a wider range of optical detectors to be used as the servo detector. FIG. 7 also shows an example of an optional servo detector 630 for detecting the servo feedback light 122 at the excitation wavelength. The servo detector 620 can be a detector designed to be sensitive to light of the excitation wavelength of the excitation beam 120 and less sensitive to light at wavelengths of the servo beam 130 and the visible light emitted by the screen 101. An optical filter 720 can be used to filter the light from the screen 101 to selectively transmit the excitation servo feedback light 122 while blocking light at other wavelengths. The servo detector signals 721 and 722 from the servo detectors 620 and 630, respectively, are directed to the processor and controller 640 for servo control operations.

In addition to phosphors, the screens can be configured to include additional optical filtering materials to enhance the performance of the screens.

Figure 8:
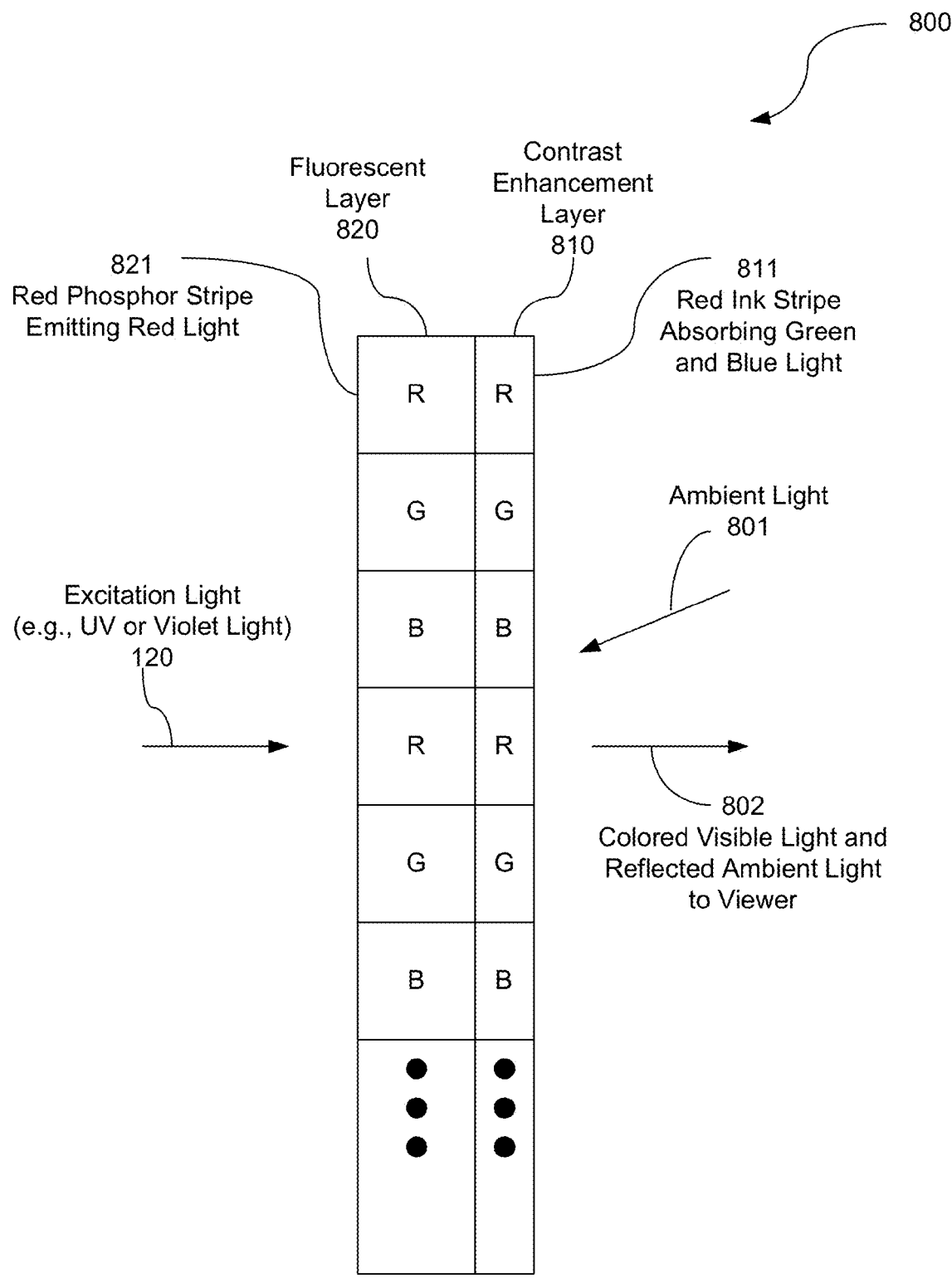
FIG. 8 shows a fluorescent screen design with a contrast enhancement layer.

FIG. 8 shows one example of a screen 800 that uses a contrast enhancement layer 810 on the viewer side of the phosphor layer 820. The phosphor layer 820 includes parallel phosphor stripes. Accordingly, the contrast enhancement layer 810 also includes matching parallel stripes made of different materials that optically filter light by transmitting certain light while rejecting other light. For a red phosphor stripe 821 that emits red light in response to excitation by the excitation light (e.g., UV or violet light), the matching stripe 811 in the contrast enhancement layer 810 is made of a "red" material that transmits in a red spectral band covering the red light emitted by the red phosphor stripe 821 and absorbs or otherwise blocks other visible light including the green and blue light. Similarly, for a green phosphor stripe that emits green light in response to excitation by UV light, the matching stripe in the contrast enhancement layer 810 is made of a "green" material that transmits in a green spectral band covering the green light emitted by the green phosphor and absorbs or otherwise blocks other visible light including the red and blue light. For a blue phosphor stripe that emits blue light in response to excitation by UV light, the matching stripe in the contrast enhancement layer 810 is made of a "blue" material that transmits in a blue spectral band covering the blue light emitted by the blue phosphor and absorbs or otherwise blocks other visible light including the green and red light. These matching parallel stripes in the contrast enhancement layer 810 are labeled as "R," "G" and "B," respectively.

In this example, the contrast enhancement layer 810 includes different stripe filtering regions that spatially align with and match respective fluorescent regions along the direction perpendicular to the screen. Each filtering region transmits light of a color that is emitted by a corresponding matching fluorescent region and blocks light of other colors. Different filtering regions in the layer 810 may be made of materials that absorb light of other colors different from the colors emitted by the respective matching fluorescent regions. Examples of suitable materials include dye-based colorants and pigment-based colorants. In addition, each filtering region in the contrast enhancement layer 510 can be a multi-layer structure that effectuates a band-pass interference filter with a desired transmission band.

In operation, the excitation light 120 (e.g., UV light) enters the phosphor layer 820 to excite different phosphors to emit visible light of different colors. The emitted visible light transmits through the contrast enhancement layer 810 to reach the viewer. The ambient light 801 incident to the screen 800 enters the contrast enhancement layer 810 and a portion of the incident ambient light 801 is reflected towards the viewer by passing through the contrast enhancement layer 810 for the second time. Therefore, the total optical output 802 towards the viewer includes image-carrying colored visible light emitted by the phosphor layer 820 and the reflected ambient light. This reflected ambient light does not carry image and thus tends to wash out the image produced at the phosphor layer 820. Because this reflected ambient light towards the viewer has passed the contrast enhancement layer 810 twice and thus has been filtered and attenuated twice, the intensity of the reflected ambient light is reduced by approximately two thirds of that of the received ambient light. As an example, the green and blue portions of the incident ambient light 801 comprise approximately two thirds of the flux of the ambient light 801 entering a red subpixel. The green and blue portions of the incident ambient light 801 are blocked by the contrast enhancement layer 810. Only the red portion of the ambient light within the transmission band of the red filter material in the contrast enhancement layer 810 transmits through the layer 810 and a part of the transmitted red ambient light is reflected back to the viewer. This part of the reflected ambient light is essentially the same color for the subpixel generated by the underlying color phosphor stripe and thus the color contrast is not adversely affected.

The above use of a color-selective absorbent material in the contrast enhancement layer 810 for each subpixel to enhance the display contrast can also be implemented by mixing such a material with the light-emitting fluorescent material in each subpixel without a separate contrast enhancement layer. In one implementation, each phosphor region in the phosphor layer design can be formed of a mixture of a fluorescent material and a color-selective absorbent material that transmits light emitted by the fluorescent material and absorbs light of other colors. Hence, the contrast enhancing feature is built into each subpixel to reduce the reflected ambient light to the viewer.

Figure 9A:
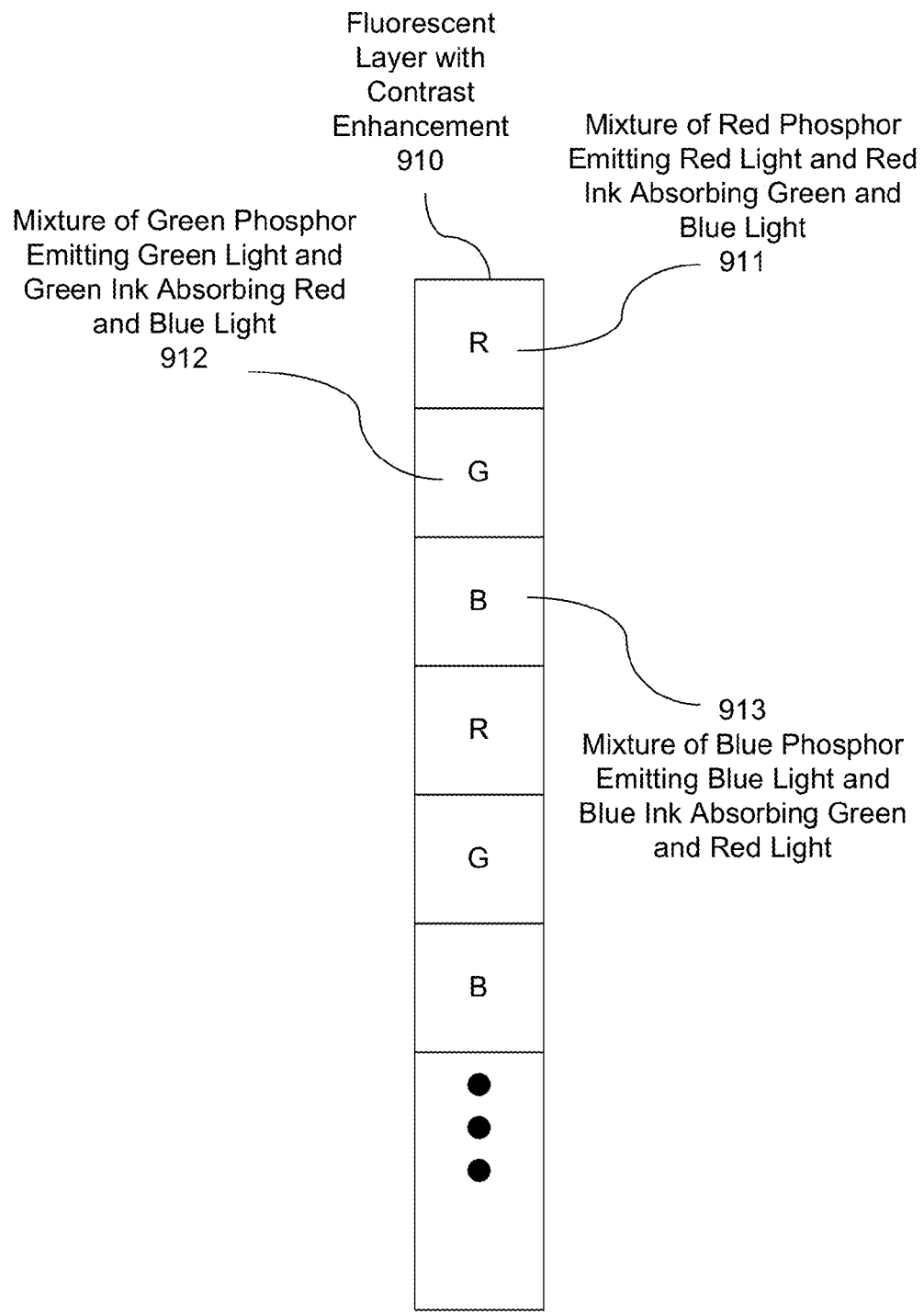
FIG. 9A shows a fluorescent screen design with a contrast enhancement material composition in each fluorescent stripe.
Figure 9B:
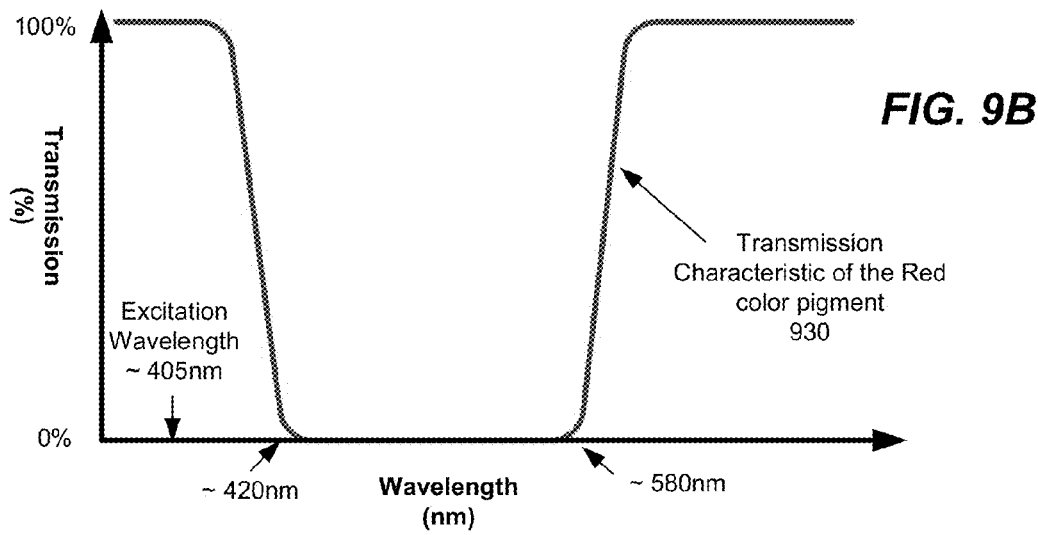
FIGS. 9B, 9C and 9D show the transmission characteristics for Red, Green, and Blue color pigments used as the contrast enhancement material in FIG. 9A.

FIG. 9A shows another implementation that uses red, green, and blue phosphor materials with built-in contrast-enhancing capability for emitting red, green and blue light, respectively, in a common phosphor layer 910 of parallel phosphor stripes. Consider three consecutive red, green and blue phosphor stripes 911, 912 and 913. The material for the red phosphor stripe 911 is a mixture of a red phosphor capable of emitting red light and a red ink or pigment which transmits the red light and absorbs other light including the green and blue light. Additionally, the red ink or pigment can have a transmission characteristic 930 as shown in FIG. 9B. Since the red ink or pigment is mixed with the red phosphor, one of the notable characteristics is that the red ink or pigment substantially transmits (~100%) below the wavelength of around 420 nm (e.g., 405 nm) in order to prevent absorbing the excitation light. Furthermore, the red ink or pigment can substantially transmit at a wavelength above around 580 nm to allow for the emitted red color from the red phosphors.

Figure 9C:
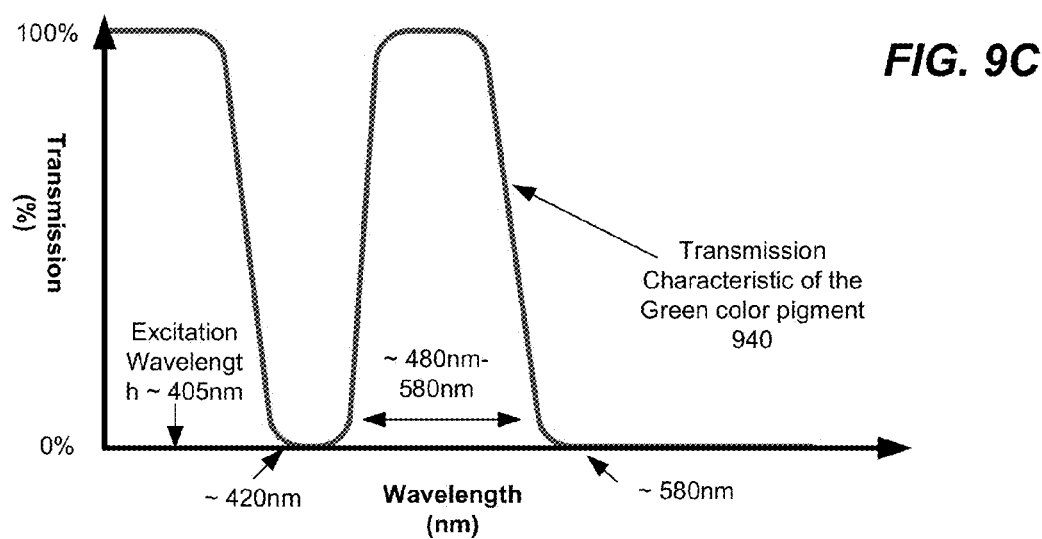

The material for the green phosphor stripe 912 is a mixture of a green phosphor emitting green light and a green ink or pigment which transmits the green light and absorbs other light including the red and blue light. Additionally, the green ink or pigment can have a transmission characteristic 940 as shown in FIG. 9C. Since the green ink or pigment is mixed with the green phosphor, one of the notable characteristics is that the green ink or pigment substantially transmits (~100%) below the wavelength of around 420 nm in order to prevent absorbing the excitation light. Furthermore, the green ink or pigment can substantially transmit at a wavelength window of above around 480 nm and below about 580 nm to allow for the emitted green color from the green phosphors.

Figure 9D:
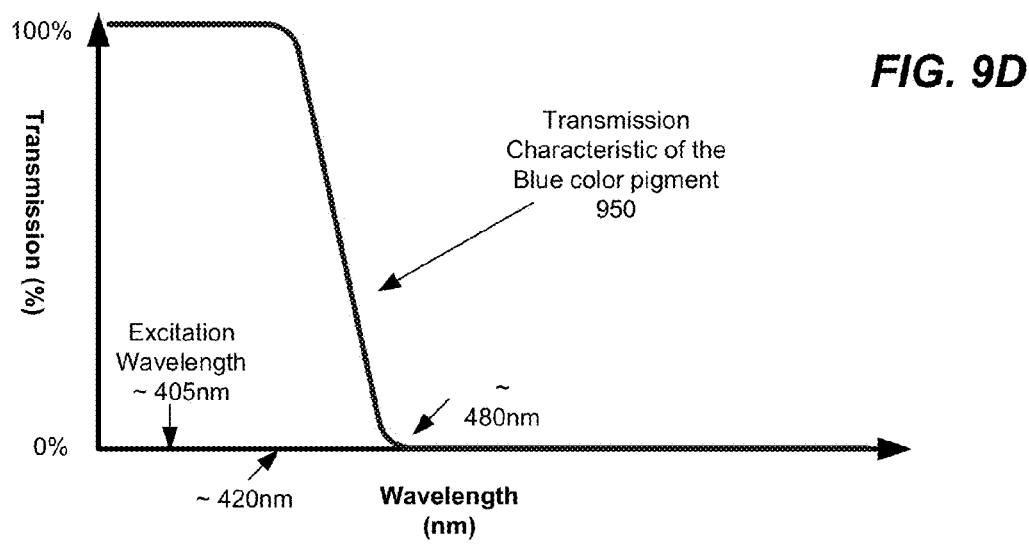

The material for the blue phosphor stripe 913 is a mixture of a blue phosphor emitting blue light and a blue ink or pigment which transmits the blue light and absorbs other light including the red and green light. Additionally, the blue ink or pigment can have a transmission characteristic 950 as shown in FIG. 9D. Since the blue ink or pigment is mixed with the blue phosphor, one of the notable characteristics is that the blue ink or pigment substantially transmits (~100%) below the wavelength of around 480 nm in order to prevent absorbing the excitation light (below ~420 nm) and to allow for the emitted blue color from the blue phosphors.

Referring to FIG. 1B, the red filtering illustrated as an additional optical filtering to control the spectral profile of the emitted red light by the composite phosphor material of silicate and nitride phosphors can be achieved by the filtering stripe in FIG. 8 and the red ink or pigment in FIG. 9A where the red ink or pigment is mixed with the red composite phosphor material to transmit and control the spectral profile of the emitted red light and absorb other light including the green and blue light.

Figure 10:
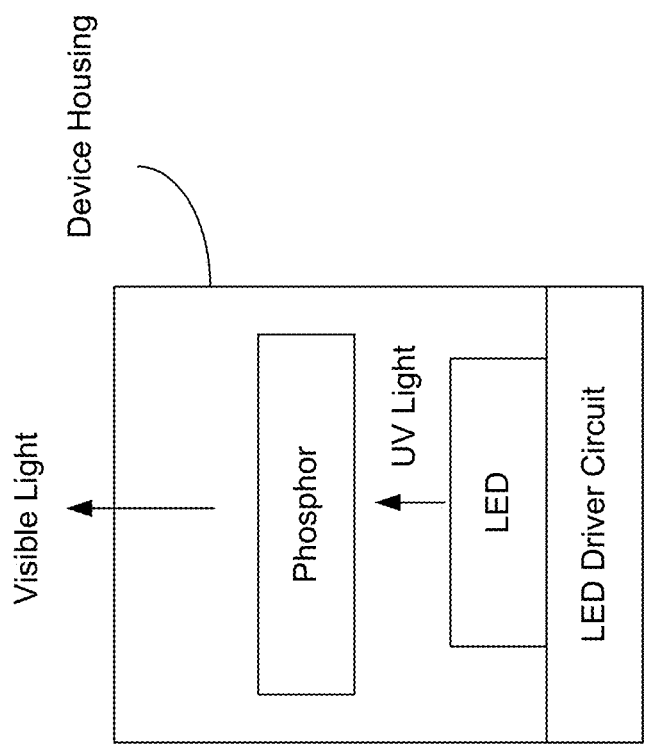
FIG. 10 shows a LED device based on composite phosphor materials disclosed in this document.

FIG. 10 shows a LED device based on composite phosphor materials disclosed in this document. This device includes a LED device housing that encloses the phosphor material and the LED light generating the UV light that causes the phosphor material to emit visible light which exits via a transparent part of the device housing. A LED driver circuit is provided to drive the LED light. The phosphor material can include one or more composite materials to produce white light or colored light.

For certain applications that require the maximum number of colors that can be reproduced via mixing red, green and blue light emitted by phosphors, a nitride red-emitting phosphor can be used to produce the deep red light without having to blend with an orange-red silicate phosphor. Such applications can be certain scanning beam displays based on the design in FIG. 1C. Among various phosphor combinations, the following examples can be advantageously used based on a pure nitride red phosphor in combination with specific blue and green phosphors to provide high fidelity in producing pure colors, color saturation and hues:

(1) $(Ba,Sr,Ca)AlSiN_3$:Eu (red between 625 nm and 635 nm), $(Sr,Ba,Ca)_2SiO_4$:Eu (green between 525 nm to 530 nm), and $Sr_3MgSi_2O_8$:Eu (blue between 455 nm and 465 nm).

(2) $(Ca,Sr,Ba) Si_2O_2N_2$:Eu (red between 625 nm and 635 nm), $(Sr,Ba,Ca)_2SiO_4$:Eu (green between 525 nm to 530 nm), and $Sr_3MgSi_2O_8$:Eu (blue).

(3) $(Ca,Sr,Ba)_2Si_5N_8$:Eu $(Ba,Ca,Sr,Eu)_2Si_5N_{8-2x}O_xC_x$, where $0 \leq Sr_3N_2 < 0.46$, $0 \leq Ba_3N_2 < 0.56$, $0 \leq Ca_3N_2 < 0.30$, $0 < Si_3N_4 < 0.7$, $0 < EuO < 0.38$, $0 < SiC \leq 0.12$ (red between 625 nm and 635 nm), $(Sr,Ba,Ca)_2SiO_4$:Eu (green between 525 nm to 530 nm), and $Sr_3MgSi_2O_8$:Eu (blue between 455 nm and 465 nm).

While this patent document contains many specifics, these should not be construed as limitations on the scope of an invention or of what may be claimed, but rather as descriptions of features specific to particular embodiments of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent document.

What is claimed is:

1. A scanning beam display system based on phosphor materials, comprising:
    an excitation light source to produce one or more excitation beams of the same wavelength having optical pulses that carry image information;
    a beam scanning module to receive the one or more excitation beams and to scan the one or more excitation beams; and
    a light-emitting screen positioned to receive the one or more scanning excitation beams and including light-emitting phosphor materials which absorb light of the one or more excitation beams to emit visible light to produce images carried by the one or more scanning excitation beam, wherein the light-emitting phosphor materials include a composite phosphor material that is a mixture of one or more red emitting nitride phosphors and one or more orange-red emitting silicate phosphors and emits light of a desired red color.

2. The system as in claim 1, wherein:
the one or more red emitting nitride phosphors include (Ba,Sr,Ca)AlSiN$_3$:Eu.

3. The system as in claim 1, wherein:
the one or more red emitting nitride phosphors include (Ca,Sr,Ba)Si$_2$O$_2$N$_2$:Eu.

4. The system as in claim 1, wherein:
the one or more red emitting nitride phosphors include (Ca,Sr,Ba)$_2$Si$_5$N$_8$:Eu.

5. The system as in claim 1, wherein:
the one or more red emitting nitride phosphors include (Ba,Ca,Sr,Eu)$_2$Si$_5$N$_{8-2X}$O$_X$C$_X$, where x is a variable to represent different relative contents of N, O and C.

6. The system as in claim 1, wherein:
the one or more orange-red emitting silicate phosphors include (Sr,Ba,Ca)$_2$SiO$_4$:Eu.

7. The system as in claim 1, wherein:
the one or more orange-red emitting silicate phosphors include (Ba,Mg,Eu,Mn)$_4$Si$_2$O$_8$.

8. The system as in claim 1, wherein:
the one or more orange-red emitting silicate phosphors include (Ba,Sr,Ca)$_3$SiO$_5$:Eu.

9. The system as in claim 1, wherein:
the one or more orange-red emitting silicate phosphors include (Sr, Ba, Ca)$_2$SiO$_4$:Eu in which $0 \leq Ba<0.35$, $0 \leq Ca<0.20$, $0<Eu<0.55$, $0.1 \leq Sr<0.65$.

10. The system as in claim 1, wherein:
the one or more orange-red emitting silicate phosphors include (Ba, Sr, Ca)$_3$SiO$_5$:Eu in which $0 \leq Ba<0.82$, $0 \leq Ca<0.57$, $0<Eu<0.84$, $0.1<Sr<0.75$.

11. The system as in claim 1, wherein:
the one or more orange-red emitting silicate phosphors include (Ba, Mg, Eu, Mn)$_4$Si$_2$O$_8$, where: $0.3 \leq Ba \leq 0.80$, $0.02 \leq Mg \leq 0.1$, $0<Eu \leq 0.25$, $0<Mn<0.1$.

12. The system as in claim 1, wherein:
a weight percentage of the one or more red emitting nitride phosphors is between 90% and 10% of a total weight of the composite phosphor and a weight percentage of the one or more orange-red emitting silicate phosphors is between 10% to 90% of the composite phosphor.

13. The system as in claim 12, wherein:
the weight percentage of the one or more red emitting nitride phosphors is equal to the weight percentage of the one or more orange-red silicate emitting phosphors.

14. The system as in claim 12, wherein:
the weight percentage of the one or more red emitting nitride phosphors is 50% and the weight percentage of the one or more orange-red emitting silicate phosphors is 50%.

15. The system as in claim 1, wherein, in the mixture of one or more red emitting nitride phosphors and one or more orange-red emitting silicate phosphors, each red-emitting nitride phosphor exhibits an emission peak within a range of 615-630 nm and each orange-red emitting silicate phosphor exhibits an emission peak within a range of 600-610 nm.

16. The system as in claim 1, wherein the light-emitting phosphor materials of the light-emitting screen are arranged as a plurality of parallel phosphor stripes where three adjacent phosphor stripes are made of three different phosphor materials: (1) a first phosphor material including the composite phosphor material including the mixture of one or more red emitting nitride phosphors and one or more orange-red emitting silicate phosphors to absorb the excitation light to emit light in red, (2) a second phosphor material to absorb the excitation light to emit light in green, and (3) a third phosphor material to absorb the excitation light to emit light in blue.

17. The system as in claim 16, wherein the light-emitting screen further includes:
a first pigment material mixed in the first phosphor material as part of a corresponding phosphor stripe to absorb green and blue light and to transmit red light;
a second pigment material mixed in the second phosphor material as part of a corresponding phosphor stripe to absorb blue and red light and to transmit green light; and
a third pigment material mixed in the third phosphor material as part of a corresponding phosphor stripe to absorb green and red light and to transmit blue light.

18. A light-emitting device based on phosphors, comprising:
phosphor materials which absorb excitation light to emit visible light and include a composite phosphor material including two or more different transition metal compounds that, under optical excitation of the excitation light, emit visible light at spectrally close but different spectral wavelengths or bands that spectrally overlap to produce a desired color,
wherein the composite phosphor material includes a mixture of one or more red emitting nitride phosphors and one or more orange-red emitting silicate phosphors and emits light of a desired red color having a higher perceived brightness level than a perceived brightness level produced by the one or more red emitting nitride phosphors without the one or more orange-red emitting silicate phosphors and at a cost lower than a cost of a mixture of one or more red emitting nitride phosphors without the one or more orange-red emitting silicate phosphors.

19. The device as in claim 18, wherein:
one of the different transition metal compounds includes (Ba,Sr,Ca)AlSiN$_3$:Eu.

20. The device as in claim 18, wherein:
one of the different transition metal compounds includes (Ca,Sr,Ba) Si$_2$O$_2$N$_2$:Eu.

21. The device as in claim 18, wherein:
one of the different transition metal compounds includes (Ca,Sr,Ba)$_2$Si$_5$N$_8$:Eu.

22. The device as in claim 18, wherein:
one of the different transition metal compounds includes (Ba,Ca,Sr,Eu)$_2$Si$_5$N$_{8-2X}$O$_X$C$_X$, where x is a variable to represent different contents of N, 0 and C.

23. The device as in claim 18, wherein:
one of the different transition metal compounds includes (Sr,Ba,Ca)$_2$SiO$_4$:Eu.

24. The device as in claim 18, wherein:
one of the different transition metal compounds includes (Ba,Mg,Eu,Mn)$_4$Si$_2$O$_8$.

25. The device as in claim 18, wherein:
one of the different transition metal compounds includes (Ba,Sr,Ca)$_3$SiO$_5$:Eu.

26. The device as in claim 18, wherein:
one of the different transition metal compounds includes (Sr, Ba, Ca)$_2$SiO$_4$:Eu in which $0 \leq Ba<0.35$, $0 \leq Ca<0.20$, $0<Eu<0.55$, $0.1 \leq Sr<0.65$.

27. The device as in claim 18, wherein:
one of the different transition metal compounds includes (Ba, Sr, Ca)$_3$SiO$_5$:Eu in which $0 \leq Ba<0.82$, $0 \leq Ca<0.57$, $0<Eu<0.84$, $0.1<Sr<0.75$.

28. The device as in claim 18, wherein:

one of the different transition metal compounds includes (Ba, Mg, Eu, Mn)$_4$Si$_2$O$_8$, where: $0.3 \leq Ba \leq 0.80$, $0.02 \leq Mg \leq 0.1$, $0 < Eu \leq 0.25$, $0 < Mn < 0.1$.

29. A scanning beam display system based on phosphor materials, comprising:

an excitation light source to produce one or more excitation beams of the same wavelength having optical pulses that carry image information;

a beam scanning module to receive the one or more excitation beams and to scan the one or more excitation beams; and a light-emitting screen positioned to receive the one or more scanning excitation beams and including light-emitting phosphor materials which absorb light of the one or more excitation beams to emit visible light to produce images carried by the one or more scanning excitation beam, wherein the light-emitting phosphor materials include (1) a composite phosphor emitting red light between 625 nm and 635 nm and including (i) an orange-red emitting silicate phosphor including (Ba, Sr,Ca)AlSiN$_3$:Eu, or (Ca,Sr,Ba) Si$_2$O$_2$N$_2$:Eu, er (Ca,Sr,Ba)$_2$Si$_5$N$_8$:Eu and (ii) a red emitting nitride phosphor, (2) (Sr,Ba,Ca)$_2$SiO$_4$:Eu that emits green light between 525 nm to 530 nm and (3) Sr$_3$MgSi$_2$O$_8$:Eu that emits blue light between 455 nm and 465 nm.

30. The system as in claim 29, wherein the emitting nitride phosphor includes a nitride phosphor including Ba, Ca or Sr and an Eu activator.

\* \* \* \* \*